US012688692B2

(12) United States Patent
Karoui et al.

(10) Patent No.: US 12,688,692 B2
(45) Date of Patent: *Jul. 21, 2026

(54) SYSTEMS AND METHODS FOR GENERATING MEDIA CONTENT

(71) Applicant: OpenTV, Inc., San Francisco, CA (US)

(72) Inventors: Sami Karoui, Scottsdale, AZ (US); Olivier Schaer, Scottsdale, AZ (US)

(73) Assignee: OPENTV, INC., San Francisco, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/542,952

(22) Filed: Dec. 18, 2023

(65) Prior Publication Data

US 2024/0193948 A1 Jun. 13, 2024

Related U.S. Application Data

(63) Continuation of application No. 17/861,677, filed on Jul. 11, 2022, now Pat. No. 11,887,369, which is a continuation of application No. 16/953,035, filed on Nov. 19, 2020, now Pat. No. 11,423,653, which is a continuation of application No. 16/145,774, filed on Sep. 28, 2018, now Pat. No. 10,872,240.

(51) Int. Cl.
| | |
|---|---|
| *G06V 20/40* | (2022.01) |
| *H04N 23/66* | (2023.01) |
| *H04N 23/68* | (2023.01) |

(52) U.S. Cl.
CPC .............. *G06V 20/42* (2022.01); *G06V 20/47* (2022.01); *H04N 23/66* (2023.01); *H04N 23/6811* (2023.01); *G06V 20/44* (2022.01)

(58) Field of Classification Search
CPC ........ G06V 20/42; G06V 20/47; G06V 20/44; H04N 23/66; H04N 23/6811; H04N 21/21805; H04N 21/23418; H04N 21/6587; H04N 21/8456; H04N 21/8549
See application file for complete search history.

(56) References Cited

U.S. PATENT DOCUMENTS

| | | | | |
|---|---|---|---|---|
| 10,506,281 | B1 * | 12/2019 | Mortensen | ............. G06V 20/41 |
| 10,872,240 | B2 * | 12/2020 | Karoui | ............... H04N 21/8456 |
| 11,423,653 | B2 * | 8/2022 | Karoui | ............. H04N 21/23418 |
| 11,887,369 | B2 * | 1/2024 | Karoui | ............... H04N 21/8549 |
| 11,956,516 | B2 | 4/2024 | Shichman et al. | |

(Continued)

*Primary Examiner* — Michael Lee

(74) *Attorney, Agent, or Firm* — POLSINELLI LLP

(57) ABSTRACT

Techniques and systems are provided for generating media content. For example, a server computer can detect a trigger from a device located at a site. The trigger is associated with an event at the site. The server computer can obtain media segments of media captured by a plurality of media capture devices located at the site. At least one of the media segments corresponds to the detected trigger. The server computer can determine one or more quality metrics of a media segment based on a first motion of an object captured in the media segment and/or a second motion of a media capture device used to capture the media segment. A subset of media segments can be selected from the obtained media segments based on quality metrics determined for the obtained media segments. A collection of media segments including the subset of media segments can then be generated.

20 Claims, 8 Drawing Sheets

(56)         References Cited

U.S. PATENT DOCUMENTS

| | | | |
|---|---|---|---|
| 2008/0188733 A1* | 8/2008 | Al-Ali | A61B 5/0004 |
| | | | 600/509 |
| 2012/0219271 A1* | 8/2012 | Vunic | G06V 20/49 |
| | | | 704/235 |
| 2012/0286955 A1* | 11/2012 | Welch | G16H 40/63 |
| | | | 340/573.1 |
| 2015/0348591 A1* | 12/2015 | Kaps | G11B 27/17 |
| | | | 386/201 |
| 2017/0265782 A1* | 9/2017 | Vollmer | A61B 5/1112 |

* cited by examiner

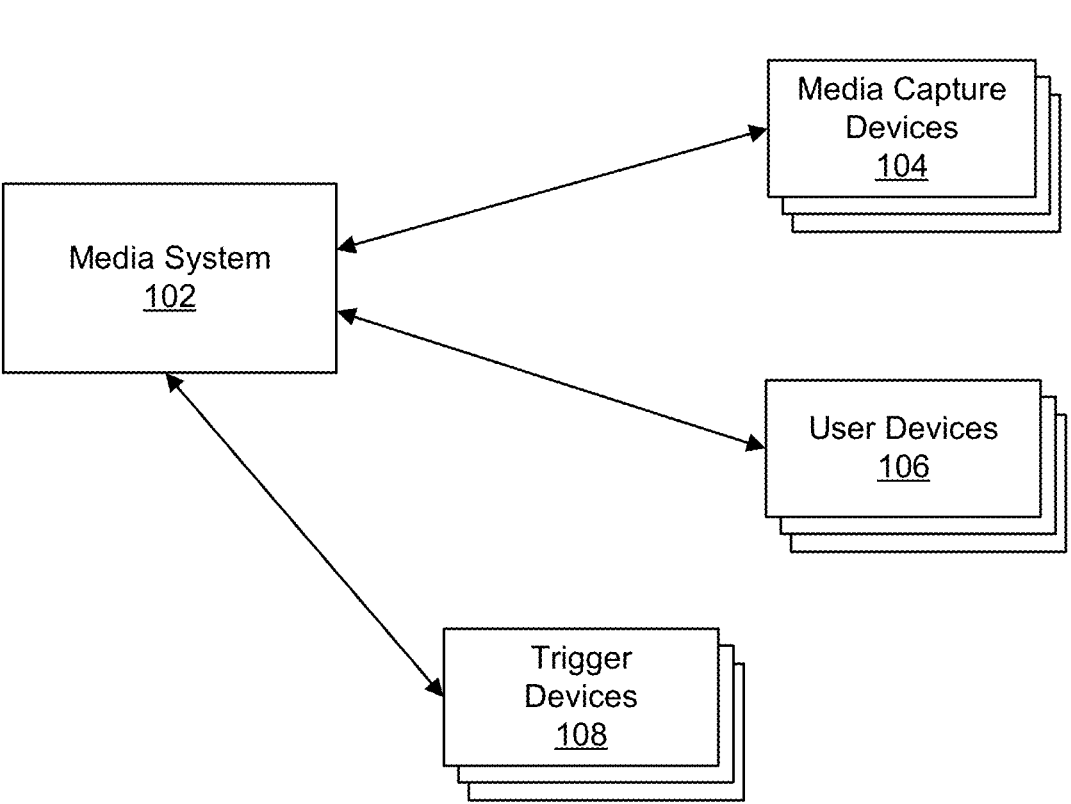
FIG. 1

200

400

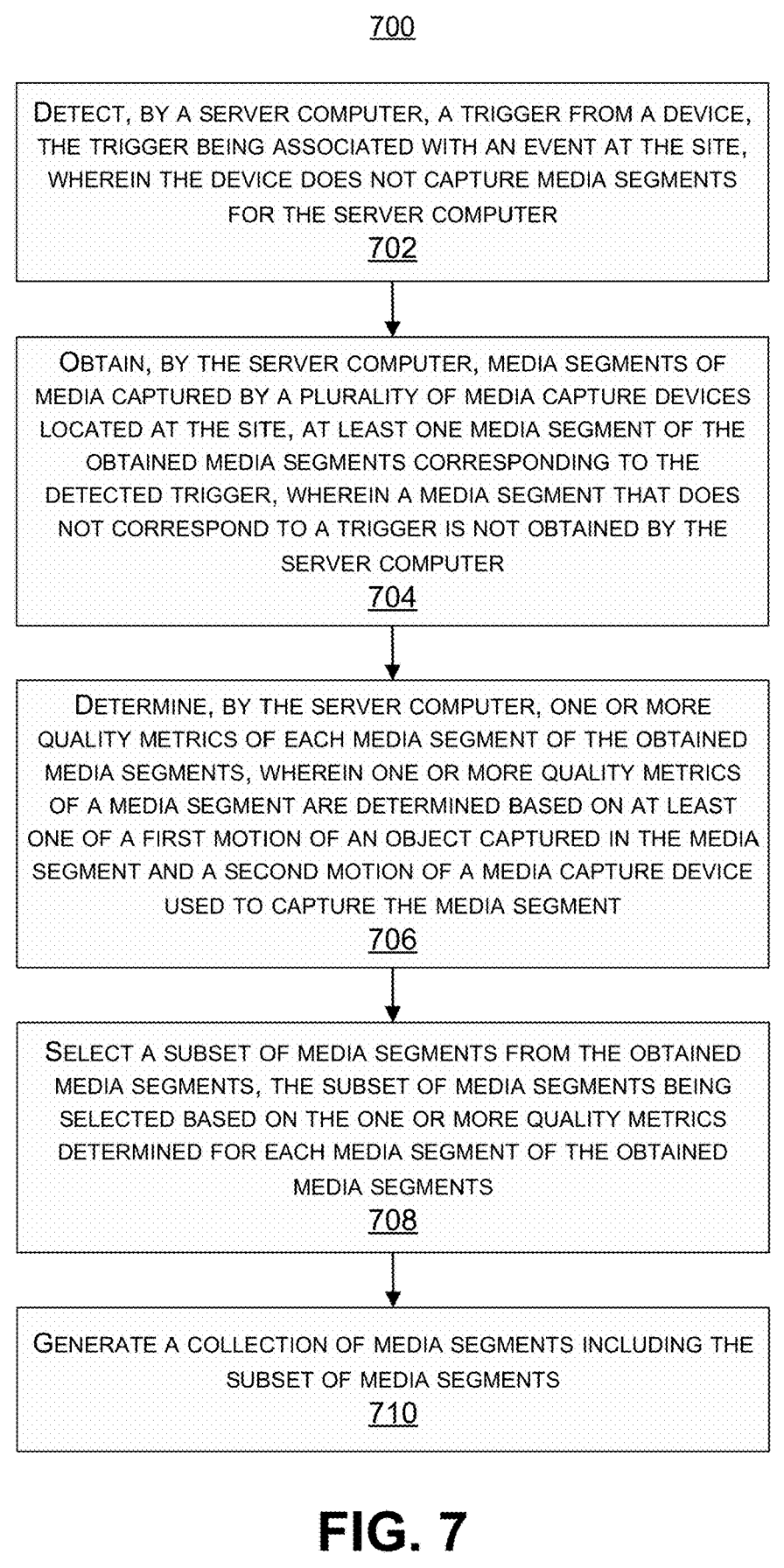

700

DETECT, BY A SERVER COMPUTER, A TRIGGER FROM A DEVICE, THE TRIGGER BEING ASSOCIATED WITH AN EVENT AT THE SITE, WHEREIN THE DEVICE DOES NOT CAPTURE MEDIA SEGMENTS FOR THE SERVER COMPUTER
702

↓

OBTAIN, BY THE SERVER COMPUTER, MEDIA SEGMENTS OF MEDIA CAPTURED BY A PLURALITY OF MEDIA CAPTURE DEVICES LOCATED AT THE SITE, AT LEAST ONE MEDIA SEGMENT OF THE OBTAINED MEDIA SEGMENTS CORRESPONDING TO THE DETECTED TRIGGER, WHEREIN A MEDIA SEGMENT THAT DOES NOT CORRESPOND TO A TRIGGER IS NOT OBTAINED BY THE SERVER COMPUTER
704

↓

DETERMINE, BY THE SERVER COMPUTER, ONE OR MORE QUALITY METRICS OF EACH MEDIA SEGMENT OF THE OBTAINED MEDIA SEGMENTS, WHEREIN ONE OR MORE QUALITY METRICS OF A MEDIA SEGMENT ARE DETERMINED BASED ON AT LEAST ONE OF A FIRST MOTION OF AN OBJECT CAPTURED IN THE MEDIA SEGMENT AND A SECOND MOTION OF A MEDIA CAPTURE DEVICE USED TO CAPTURE THE MEDIA SEGMENT
706

↓

SELECT A SUBSET OF MEDIA SEGMENTS FROM THE OBTAINED MEDIA SEGMENTS, THE SUBSET OF MEDIA SEGMENTS BEING SELECTED BASED ON THE ONE OR MORE QUALITY METRICS DETERMINED FOR EACH MEDIA SEGMENT OF THE OBTAINED MEDIA SEGMENTS
708

↓

GENERATE A COLLECTION OF MEDIA SEGMENTS INCLUDING THE SUBSET OF MEDIA SEGMENTS
710

FIG. 7

SYSTEMS AND METHODS FOR GENERATING MEDIA CONTENT

CROSS-REFERENCE TO RELATED APPLICATIONS

This application is a continuation of U.S. patent application Ser. No. 17/861,677 filed Jul. 11, 2022, which is a continuation of U.S. patent application Ser. No. 16/953,035 filed Nov. 19, 2020, which is a continuation of U.S. patent application Ser. No. 16/145,774, filed Sep. 28, 2018, the contents of which are hereby expressly incorporated by reference in their entirety for all purposes.

FIELD

The present disclosure generally relates to techniques and systems for generating media content, and more specifically to generating media content of an event.

BACKGROUND

Media capture devices can capture various types of media content, including images, video, and/or audio. For example, a camera can capture image data or video data of a scene. The media data from a media capture device can be captured and output for processing and/or consumption. For instance, a video of a scene can be captured and processed for display on one or more viewing devices.

Media content from multiple media capture devices can be used to generate media clips that include different qualities, perspectives, and occurrences in a scene. However, it can be difficult to capture the highest quality and the most relevant media segments at different points in time from different media capture devices. Such a problem can become even more difficult when a large volume of media content is available for processing.

BRIEF SUMMARY

In some examples, techniques and systems are described herein for generating media content. For instance, a media system can obtain different media content items obtained from media capture devices located at a site. The media content items can include video, audio, images, any combination thereof, and/or any other type of media. The media system can curate certain media segments from the obtained media content items into a collection of media content.

In some examples, a collection of media content can include a group of selected media segments organized in a way that results in multiple shortened clips of the captured media content having different characteristics. For instance, the media segments in the collection of media content can be from different points in time, can be from different viewpoints or perspectives within the site, can have different zoom amounts, can have different display and/or audio characteristics, can have a combination thereof, and/or can have any other suitable variations from media segment to media segment. In some cases, the obtained media content can be captured during an event occurring at the site. For instance, a collection of media content can provide a highlight reel of the event by including a group of media segments capturing different views of the event at different points in time.

Candidate media segments that may be included in a collection of media content can be selected based on triggers that are associated with the media segments. The triggers can be used to indicate that a moment of interest has occurred within an event, as captured by the media content. In some cases, a trigger can be associated with a time within the event. Other data associated with the event can also be obtained and, in some cases, can be associated with a time within the event. In some examples, the triggers can be generated by devices located at the site of the event where media content is being captured, and/or by devices of users remotely observing the event (e.g., users viewing the event on a television, mobile device, personal computer, or other device). In some examples, the triggers can be automatically generated based on an indication that a moment of interest may have occurred during the event. For instance, a trigger can be generated by a device based on detection of an occurrence (also referred to as a moment) during the event, based on a characteristic of a user of a device located at the site during the event, based on a characteristic of a user observing the event remotely, any combination thereof, and/or other indication of a significant occurrence during the event.

The media system can analyze the selected candidate media segments for quality to determine which media segments will be included in a collection of media content. For example, the quality of a media segment can be determined based on factors that indicate the level of interest those media segments might have to potential viewers. In some examples, the quality of a media segment can be determined based on motion of one or more objects captured in the media segment, based on motion of a media capture device used to capture the media segment, based on a number of triggers associated with the media segment, based on presence of a particular object in the media segment, a combination thereof, and/or any other suitable characteristic of the media segment. The highest quality candidate media segments from the candidate media segments can then be selected for inclusion in the collection of media content.

According to at least one example, a method of generating media content is provided. The method includes detecting, by a server computer, a trigger from a device, the trigger being associated with an event at the site. The device does not capture media segments for the server computer. The method further includes obtaining, by the server computer, media segments of media captured by a plurality of media capture devices located at the site. At least one media segment of the obtained media segments corresponds to the detected trigger. A media segment that does not correspond to a trigger is not obtained by the server computer. The method further includes determining, by the server computer, one or more quality metrics of each media segment of the obtained media segments. One or more quality metrics of a media segment are determined based on at least one of a first motion of an object captured in the media segment and a second motion of a media capture device used to capture the media segment. The method further includes selecting a subset of media segments from the obtained media segments, the subset of media segments being selected based on the one or more quality metrics determined for each media segment of the obtained media segments. The method further includes generating a collection of media segments including the subset of media segments.

In another example, a system is provided that includes one or more processors and a memory configured to store media data. The one or more processors are configured to and can detect a trigger from a device, the trigger being associated with an event at the site. The device does not capture media segments for the server computer. The one or more processors are further configured to and can obtain media segments of media captured by a plurality of media capture devices located at the site. At least one media segment of the obtained media segments corresponds to the detected trigger. A media segment that does not correspond to a trigger is not obtained by the server computer. The one or more processors are further configured to and can determine one or more quality metrics of each media segment of the obtained media segments. One or more quality metrics of a media segment are determined based on at least one of a first motion of an object captured in the media segment and a second motion of a media capture device used to capture the media segment. The one or more processors are further configured to and can select a subset of media segments from the obtained media segments, the subset of media segments being selected based on the one or more quality metrics determined for each media segment of the obtained media segments. The one or more processors are further configured to and can generate a collection of media segments including the subset of media segments.

In another example, a non-transitory computer-readable medium of a server computer is provided that has stored thereon instructions that, when executed by one or more processors, cause the one or more processor to: detect a trigger from a device, the trigger being associated with an event at the site, wherein the device does not capture media segments for the system; obtain media segments of media captured by a plurality of media capture devices located at the site, at least one media segment of the obtained media segments corresponding to the detected trigger, wherein a media segment that does not correspond to a trigger is not obtained by the system; determine one or more quality metrics of each media segment of the obtained media segments, wherein one or more quality metrics of a media segment are determined based on at least one of a first motion of an object captured in the media segment and a second motion of a media capture device used to capture the media segment; select a subset of media segments from the obtained media segments, the subset of media segments being selected based on the one or more quality metrics determined for each media segment of the obtained media segments; and generate a collection of media segments including the subset of media segments.

In some aspects, the trigger is generated in response to user input obtained by the device. In some aspects, the trigger is automatically generated by the device based on at least one or more of detection of a moment during the event and a characteristic of a user during the event.

In some aspects, obtaining the media segments comprises: receiving a first stream of media captured by a first media capture device of the plurality of media capture devices; receiving a second stream of media captured by a second media capture device of the plurality of media capture devices; and extracting a first media segment from the first stream of media and a second media segment from the second stream of media.

In some aspects, the trigger is a first trigger. In such aspects, the methods, apparatuses, and computer-readable medium described above can further comprise detecting a second trigger, the second trigger being associated with the event at the site. In such aspects, a first media segment corresponds to the first trigger and a second media segment corresponds to the second trigger. In some aspects, obtaining the media segments comprises: sending the first trigger to a first media capture device of the plurality of media capture devices, the first trigger causing the first media segment to be extracted from media captured by the first media capture device; sending the second trigger to at least one of the first media capture device and a second media capture device of the plurality of media capture devices, the second trigger causing the second media segment to be extracted from media captured by at least one of the first media capture device and the second media capture device; and receiving the extracted first media segment and the extracted second media segment from at least one of the first media capture device and the second media capture device.

In some aspects, the methods, apparatuses, and computer-readable medium described above further comprise associating, by the server computer (or the system), the first trigger and the second trigger with a time in the event at the site. In such aspects, the obtained media segments correspond to times associated with the first trigger and the second trigger.

In some aspects, the subset of media segments is further selected based on a number of triggers associated with each media segment in the subset of media segments.

In some aspects, the one or more quality metrics of the media segment are further based on presence of an object in the media segment.

In some aspects, selecting the subset of media segments from the obtained media segments includes: obtaining a first media segment of the event captured by a first media capture device; obtaining a second media segment of the event captured by a second media capture device, the first media segment and the second media segment being captured at a same time and from different perspectives in the event; determining an amount of motion of one or more objects captured in the first media segment is greater than an amount of motion of one or more objects captured in the second media segment; and selecting the first media segment based on the amount of motion of the one or more objects captured in the first media segment being greater than the amount of motion of the one or more objects captured in the second media segment.

In some aspects, the methods, apparatuses, and computer-readable medium described above further comprise providing the collection of media segments to one or more devices.

In some aspects, the device is located at the site. In some aspects, the device is located at a location remote from the site.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 1 is a block diagram illustrating an example of a network environment, in accordance with some examples;

FIG. 7 is a flowchart illustrating an example of a process of generating media content, in accordance with some examples.

DETAILED DESCRIPTION

Figure 2:
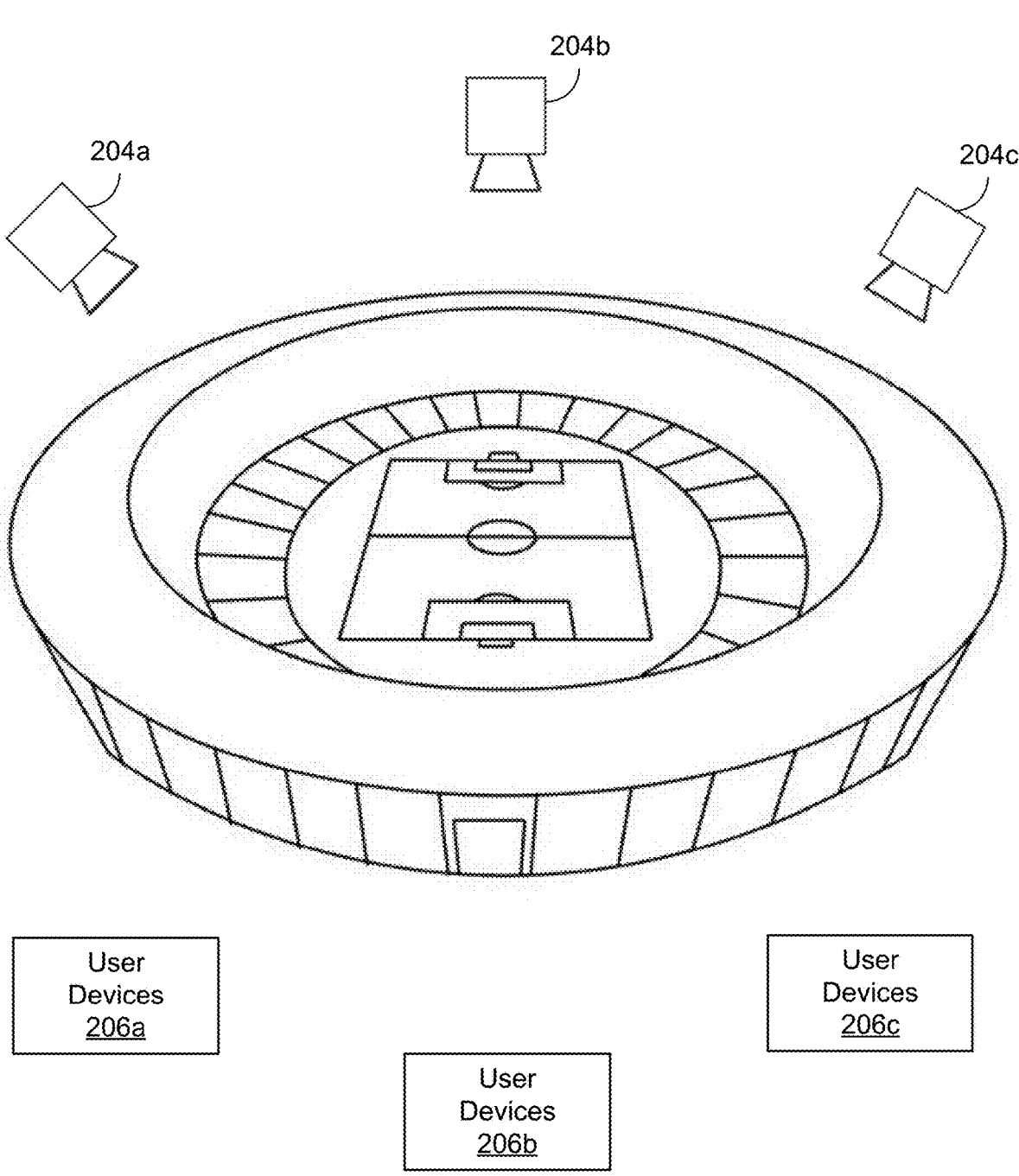
FIG. 2 is a diagram illustrating an example of a site at which an event is taking place, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Media capture devices can be used to capture media content (e.g., images, video, audio, and/or other types of media content). The captured media content can be processed and output for consumption. In some cases, media content from multiple media capture devices can be combined and used to generate one or more media content items that have various perspectives of an event or scene (e.g., different views, sounds, zoom levels, or the like).

However, problems arise when using media content from multiple media capture devices. For example, it can be challenging to capture and to select the highest quality media segments and the most relevant media segments at different points in time (e.g., during an event). For instance, it can be difficult to collect high quality media content (e.g., video and/or audio, images, or other content) from the best views and at the right times. It can also be difficult to collect and organize videos captured by different user devices, from different angles, and at different points in time. Such difficulties are exacerbated when a large volume of media content is available for processing. For instance, it can be challenging to discover the best quality and/or the most relevant content in large volume of video, and can also be challenging to create media content collections (e.g., highlight reels) using the best quality and/or the most relevant content.

Systems, methods, and computer-readable media are described herein for generating media content. For example, the systems, methods, and computer-readable media can automate the collection and curation of media content into a collection of media content. In some cases, the systems, methods, and computer-readable media can automate the aggregation of a collection of curated media content into a single media content item. The systems, methods, and computer-readable media can reduce the amount of human activity required to generate such media content, decreasing the time and cost required. The systems, methods, and computer-readable media can also reduce the amount of computer resources, such as devices, storage and processor usage, required to generate a collection of media content by minimizing the amount of media content captured and/or stored, by minimizing the amount of analysis needed to determine quality and relevance of the content, among others. The amount of network bandwidth required to upload the media content to one or more servers (e.g., one or more cloud servers, one or more enterprise servers, and/or other servers) can also be reduced by aggregating multiple user triggered capture requests into a single media file delivered to multiple users.

FIG. 1 is a block diagram illustrating an example of a network environment 100. The network environment 100 includes a media system 102, one or more media capture devices 104, one or more user devices 106, and one or more trigger devices 108. The media system 102 can include one or more server computers that can process media data, triggers, and/or other data. Further details of an example media system 302 are described below with respect to FIG. 3.

In some cases, the media system 102 can include a cloud infrastructure system (also referred to as a cloud network) that provides cloud services to the one or more media capture devices 104 and the one or more user devices 106 (and in some cases to the one or more trigger devices 108). For example, an application (e.g., mobile application or other suitable device application) and/or a website associated with a provider of the media system 102 can be installed and/or executed by the one or more media capture devices 104 and/or the one or more user devices 106. In such an instance, the application and/or website can access (through a network) the cloud services provided by the media system 102. In another example, the cloud network of the media system 102 can host an application, and a user can order and use the application on demand through a communication network (e.g., the Internet, a WiFi network, a cellular network, and/or using another other suitable communication network). In certain embodiments, the cloud services provided by the media system 102 can include a host of services that are made available to users of the cloud infrastructure system on demand. Services provided by the cloud infrastructure system can dynamically scale to meet the needs of its users. The cloud network of the media system 102 can comprise one or more computers, servers, and/or systems. In some cases, the computers, servers, and/or systems that make up the cloud network are different from on-premises computers, servers, and/or systems that may be located at a site (e.g., a site hosting an event).

The one or more server computers can be in communication with the one or more media capture devices 104, the one or more user devices 106, and the one or more trigger devices 108 using a wireless network, a wired network, or a combination of a wired network and a wireless network. A wireless network can include any wireless interface or combination of wireless interfaces (e.g., the Internet, cellular such as 3G, Long-Term Evolution (LTE), or 5G, a combination thereof, and/or other suitable wireless network). A wired network may include any wired interface (e.g., fiber, ethernet, powerline ethernet, ethernet over coaxial cable, digital signal line (DSL), or other suitable wired network). The wired and/or wireless networks may be implemented using various routers, access points, bridges, gateways, or the like, that can connect the media system 102, the media capture devices 104, the user devices 106, and the trigger devices 108 to the network.

The one or more media capture devices 104 can be configured to capture media data. The media data can include video, audio, images, any combination thereof, and/or any other type of media. The one or more media capture devices 104 can include any suitable type of media capture devices, such as a personal or commercial video camera (e.g., a digital camera, an IP camera, a video streaming device, or other suitable type of video camera), a mobile or stationary telephone handset (e.g., smartphone, cellular telephone, or the like), an audio capture device (e.g., a voice recorder, a microphone, or other suitable audio capture device), a camera for capturing still images, or any other type of media capture device. In one illustrative example, a media capture device 104 can include a video camera (or a device with a built-in video camera) that captures video content. In such an example, the video camera can also capture audio content that is synchronized with the video content using known techniques.

The one or more trigger devices 108 are configured to generate triggers that can be used to determine candidate media segments from captured media that are considered for inclusion in a collection of media content. A trigger device 108 can include an interface (e.g., a button, a key, a touchscreen display, a microphone, or other suitable interface) that a user can interact with in order to cause a trigger to be generated. For example, a user can press a button on a trigger device 108, which can cause the trigger device 108 to send a trigger to the media system 102 at a certain point during a media content item.

The one or more user devices 106 can include a personal electronic device, such as a mobile or stationary telephone handset (e.g., smartphone, cellular telephone, or the like), a camera (e.g., a digital camera, an IP camera, a video camera, a camera phone, a video phone, or other suitable capture device), a laptop or notebook computer, a tablet computer, a digital media player, a video gaming console, a video streaming device, a desktop computer, or any other suitable type of electronic device. The one or more user devices 106 can also generate triggers that can be used to determine candidate media segments from captured media that are considered for being included in a collection of media content. In some cases, the one or more user devices 106 do not provide media content to the media system 102. For example, the users of the one or more user devices 106 may elect not to provide media content, and/or may not be authenticated for providing media content, to the media system 102.

The media system 102 is configured to obtain media from one or more of the media capture devices 104. Candidate media segments from the captured media can be selected based on the one or more triggers. A media segment can include a portion of an entire media content item. In one illustrative example, a media content item can include a video captured by a video capture device, and a media segment can include a portion of the video (e.g., the first ten seconds of the entire video, or other portion of the video). In some cases, the media system 102 can receive the media captured by the media capture devices 104, and can select the candidate media segments from the received media using the one or more triggers. In some cases, the media capture devices 104 can select the candidate media segments using the one or more triggers, and can send the selected media segments to the media system 102. The one or more triggers can include triggers generated by the user devices 106 and/or the trigger devices 108, as noted above, and/or can include automatically-generated triggers. In some cases, the one or more media capture devices 104 can generate one or more triggers.

As described in more detail below, a trigger can be automatically generated based on an indication that a moment of interest may have occurred during an event for which media is being captured. In some examples, a trigger can be automatically generated based on detection of an occurrence (or moment) during an event at the site, based on a characteristic of a user of a device located at the site during the event, based on a characteristic of a user observing the event remotely, any combination thereof, and/or other indication of a significant occurrence during the event.

The media system 102 can evaluate the candidate media segments to determine which media segments to include in the collection of media content. As described in more detail below, one or more quality metrics can be determined for a media segment, and can be used to determine whether that media segment will be included in the collection of media content. The quality of a media segment can be determined based on factors indicative of the level of interest those media segments might have to potential viewers. In some cases, the quality metrics determined for the media segments can be compared to determine the media segments that will be included in the collection of media content. For instance, quality metrics determined for a first media segment can be compared with a quality metrics determined for a second media segment, and the first media segment or the second media segment that has the higher quality based on the comparison will be selected for inclusion in the collection of media content.

In some examples, the collection of media content can include a group of selected media segments that are combined, resulting in multiple shortened clips of captured media content from different media capture devices. The group of selected media segments can have different characteristics, which can be based on characteristics or settings of the media devices when the different media segments were captured. For instance, using video and audio as an example, the media segments in the collection of media content can be from different points in time, can be from different viewpoints of a site, can have different zoom amounts, can have different display and/or audio characteristics, can have a combination thereof, and/or can have any other suitable variations from media segment to media segment in the collection. In some examples, the collection of media content can include one or more separate, individual media clips. For instance, one or more video segments captured by a video capture device can selected as a video clip that will be provided for viewing by one or more devices.

Some examples provided herein use video as an illustrative example of media content. However, one of ordinary skill will appreciate that the systems and techniques described herein apply to any type of media content, including audio, images, metadata, and/or any other type of media. Furthermore, in some cases, video content can also include audio content that is synchronized with the video content using known techniques.

In some cases, the obtained media content can be captured during an event occurring at a site. FIG. 2 is a diagram illustrating an example of a site 200 at which an event is taking place. An event can include a sporting event (as shown in FIG. 2), a performing arts event (e.g., a musical event, theatrical event, dance event, or other performing arts event), an art exhibit, or any other type of event. Multiple media capture devices can be arranged at different locations within the site 200. The media capture devices can include any suitable type of media capture device. For example, as shown, three video capture devices 204a, 204b, and 204c are positioned at three different locations within the site 200. The video capture devices 204a, 204b, and 204c can capture video of the event from different viewpoints within the site 200 (also referred to as fields of view or perspectives). In some implementations, the video capture devices 204a, 204b, and 204c can continuously capture video of the event (e.g., from a point in time before the event starts to a point in time after the event ends). In some implementations, the video capture devices 204a, 204b, and 204c can capture video of the event on demand. For instance, one or more of the video capture devices 204a, 204b, and 204c can capture video only when receiving a command to do so from a media system (e.g., media system 102, not shown in FIG. 2), from a user device (e.g., user device 206a, 206b, or 206c), from a trigger device, from any other suitable device, from a user providing input using an interface of the video capture devices 204a, 204b, and 204c, or using any other command. In one illustrative example, a video capture device can capture video upon receiving a trigger, an input command, and/or other input, as described in more detail herein. In some cases, one or more of the video capture devices 204a, 204b, and 204c can continuously capture video of the event, while at the same time can serve on-demand video segment requests to the media system. For instance, the filmed video footage can be stored locally on the video capture devices 204a, 204b, and 204c, while on-demand video segments (e.g., segments determined based on one or more triggers) can be delivered to the server and, in some cases, made available to users that are registered and/or authenticated with a service provided by the media system and associated with that event. For example, as described in more detail below, a video segment (e.g., as a stand-alone video segment, in a collection of media content such as a highlight reel, in a group of selected video clips, or the like) can be made available to the user who captured the video segment and also to other registered users that are associated with that event.

User devices 206a, 206b, and 206c may also be located at the site 200. The user devices 206a, 206b, and 206c can include devices used by people that are attending the event, devices used by people observing the event remotely (e.g., watching on a television, mobile device, personal computer, or other device), or other suitable devices that are in communication with the media system (not shown). Each of the user devices 206a, 206b, and 206c can include any suitable electronic device.

While three video capture devices 204a, 204b, and 204c and three user devices 206a, 206b, and 206c are shown in FIG. 2, one of ordinary skill will appreciate that more or fewer video capture devices and/or user devices can be located within the site 200. In some implementations, one or more trigger devices (not shown) may also be used by users at the event and/or by users observing the event remotely.

Using information from the video capture devices 204a, 204b, and 204c and the user devices 206a, 206b, and 206c, the media system can generate a collection of media content. The collection of media content can include a group of video segments (from video captured by the video capture devices 204a, 204b, and 204c) providing different views of the event at different points in time. For instance, the collection of media content can provide a highlight reel of the event. Any given point in time during an event can also have different views for that point in time. In some cases, multiple views for a given point in time can be included in the collection of media content (e.g., based on the views that have the highest quality, as described below). In some cases, a single view for a given point in time determined to have the highest quality can be included in the collection of media content.

Figure 3:
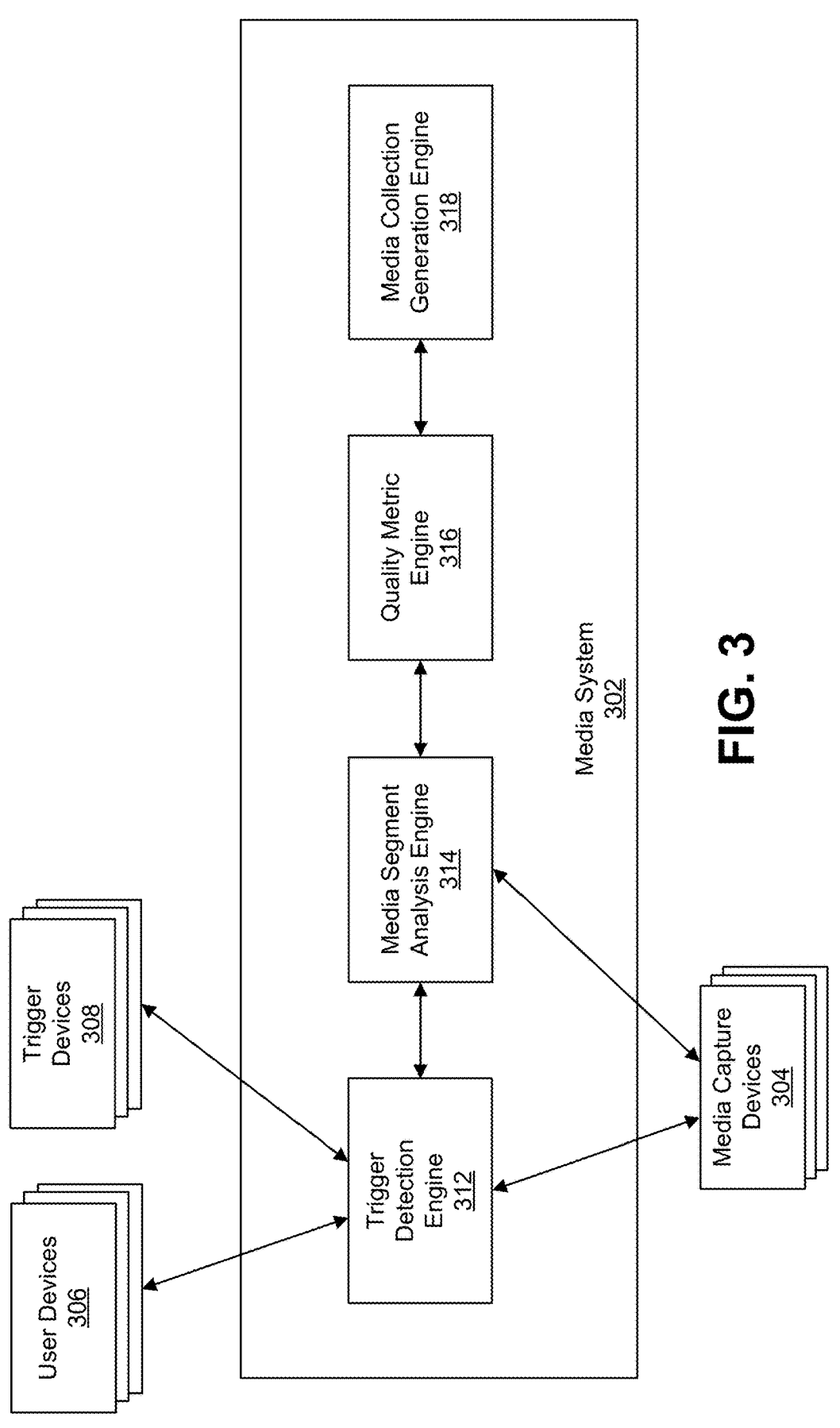
FIG. 3 is a diagram illustrating an example of a media system, in accordance with some examples.

FIG. 3 is a diagram illustrating an example of a media system 302. The media system 302 can be in communication with one or more media devices 304 and one or more user devices 306 (and in some cases one or more trigger devices 308) that are located at a site hosting an event (such as the event hosted at the site 200 shown in FIG. 2). The media system 302 can also be in communication with devices (not shown) of users that are observing the event remotely. The media system 302 includes various components, including a trigger detection engine 312, a media segment analysis engine 314, a quality metric engine 316, and a media collection generation engine 318. The components of the media system 302 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the media system 302 is shown to include certain components, one of ordinary skill will appreciate that the media system 302 can include more or fewer components than those shown in FIG. 3. For example, the media system 302 may also include, in some instances, one or more memory devices (e.g., RAM, ROM, cache, buffer, and/or the like), processing devices, one or more busses, and/or other devices that are not shown in FIG. 3.

In some cases, the media system 302 can also include an authentication engine (not shown). The authentication engine can authenticate users of the user devices 306 that are at the site hosting the event (and/or observing the event remotely) and that will not be providing video (and/or other media) to the media system 302. The users of the user devices 306 (which will not be providing video of the event to the media system 302) can be authenticated through the user devices 306. The authentication engine can also authenticate the media capture devices 304 (and/or the users of the media capture devices 304) that are at the event and that will be providing video (and/or other media) of the event to the media system 302.

The users of the user devices 306 and users of the media capture devices 304 can be authenticated through an application (installed on the devices 304 and/or 306) that is associated with a provider of the media system 302, through a website associated with the provider of the media system 302 (e.g., the website can be executed by a browser of the user device 306), and/or using any other suitable authentication platform. For example, a user can register with the service provided by the media system 302 (e.g., through the application, the website, or other platform). A user can register with the service provided by the media system 302 by creating an account with the service (e.g., selecting a user name and password, providing answers to security questions, entering contact information, and/or providing other information using the application, website, or other platform). Upon registering, the user can be associated with login credentials (e.g., a user name and password) that allow the user to be authenticated by the media system 302. The action of authenticating is performed when a registered user provides credentials so that the user becomes identified as the actual owner of the registered account and as being signed-in to the application, website, or other platform. Once authenticated, the activities (e.g., content played, content captured, content created, events joined, invites, among other activities) associated with the user are associated to his account. The user can then retrieve the activities at a later time by re-authenticating (e.g., signing back in) with the service. As described below, in some cases, a user can also use the service as an "anonymous" user.

Once registered with the service provided by the media system 302, the user can also join and/or be invited to certain events. In one illustrative example, a user can purchase a ticket for an event, and the ticket information can be used to authenticate that the user for the event. In another illustrative example, a user can join an event through the application, the website, or other platform associated with the provider of the media system 302. Upon joining or being invited to—a particular event, the user can be authenticated for the event. Users that are authenticated for an event can use their devices (e.g., the one or more media devices 304, one or more user devices 306, and/or one or more trigger devices 308) to generate triggers for the event, to access media content provided by the media system 302 for that event, and/or to provide media content to the media system 302 for generating a collection of media content. In some cases, one or more of the media capture devices 304 may be personal devices owned by a particular user. In some cases, one or more of the media capture devices 304 may not be personal devices, and thus may not be owned by a particular user. Media capture devices that are not personal devices can, in some cases, be pre-registered as authorized media sources by the media system 302.

In some examples, different types of users can join an event and/or capture media content for the event. For example, in addition to authenticated users (as described above), "anonymous" users can join an event and/or capture media content for the event. An anonymous user can include a user that has not registered with the service or a user that has registered with the service but is not signed into the application (and is thus not authenticated by the service). In some cases, only a subset of features can be made available to anonymous users. In some cases, activities of anonymous users and/or content created for the anonymous users may not be able to be retrieved by the anonymous users during subsequent connections with the application or website associated with the provider of the media system 302, because it may not be known to which account such activities and/or content should be paired.

The trigger detection engine 312 can detect triggers generated by devices or automatically-generated triggers. A trigger indicates that a moment of interest has occurred during the event. For example, a trigger from a user (through a user device 306 or media capture device 304) can indicate a request from the user to time-tag a portion of video (or other media content) in relation to the moment of interest in the event. The trigger detection engine 312 can receive triggers generated by user devices 306 and in some cases triggers generated by media capture devices 304 (e.g., when a media capture device is a personal device of a user attending the event). In some cases, triggers are received only from authenticated users that have been authenticated by the authentication engine. In some examples, a trigger can be generated by a user device 306 or by a media capture device 304 in response to user input. The user input can be provided through the application associated with the provider of the media system 302 that is installed on the device. The user input can also be provided through the website associated with the provider of the media system 302. For instance, once a user has logged into the application or website (and has thus been authenticated by the media system 302), the user can click or otherwise select a virtual button of a graphical interface of the application or website. The user device 306 or media capture device 304 can generate a trigger in response to selection of the virtual button. While a virtual button is used herein as an example of a selectable option for generating a trigger, one of skill will appreciate that any other selection mechanism can be used to generate a trigger, such as using a physical button, using one or more gesture inputs, using one or more voice inputs, a combination thereof, and/or other input.

In some cases, the trigger detection engine 312 can also receive triggers from trigger devices 308. As described above, a trigger device 308 can include an interface (e.g., a button, a key, a touchscreen display, a microphone, or other suitable interface) that a user can interact with in order to cause a trigger to be generated. For example, a user can press a button on a trigger device (e.g., a physical button, a virtual button, or the like), which can cause the trigger device to send a trigger to the media system 302. In another example, a user can open the application or website associated with the provider of the media system 302 that is installed or executed on a user device 306 and/or a media capture device 304. The trigger device 308 can be associated with or synchronized to the event through the application or website, after which the user can interact with the interface of the trigger device 308 to generate triggers. For example, the trigger device 308 can be connected (e.g., using a wireless or wired link) with the user device 306 and/or media capture device 304 running the application or website, and the application or website can facilitate association of the trigger device 308 with the application or website. A user can then use the trigger device 308 to generate triggers that are sent to the application or website (e.g., over the wireless or wired link).

In some cases, media capture devices 304, user devices 306, and/or trigger devices 308 can be paired directly or indirectly with an event. For example, in the example where the interface for generating a trigger is a software button, the software button can be directly paired with an event by being present inside an event view graphical user interface of the application or website (associated with the media system 302). In some cases, in the event the interface for generating a trigger is a hardware button, the hardware button can be indirectly paired to an event through the application or website. For example, the hardware button can be paired with a mobile application that is running in an event context associated with a specific event. In such an example, the hardware button may only work when the application is running the event context, in which case the button may work with the application running in the foreground (e.g., when the application is opened by a user) and/or with the application running in the background (e.g., when the application not being currently displayed by the device and/or when the application is closed). A trigger can also be generated by a third party system (e.g. a scoreboard or other system) that can be paired indirectly with the event. For example, the third party system can be paired with a "place" object in the system, and the place would be paired with an event for a given date and time. A "place" object is a representation on the media system 302 of a site, a location, a facility, a field (e.g., a sport field, a park, or the like). In some cases, a "place" object can be defined for permanent setups. In one illustrative example, when the service provided by the media system 302 is installed as a permanent setup at a hockey rink, a "place" object can be created that corresponds to each ice on that rink. Events can then be scheduled to happen on each of the defined "place" objects. In some examples, when a third party system (e.g., a scoreboard or other system) is paired to a defined "place," the third party system can be indirectly paired to events, as the media system 302 starts and stops scheduled events occurring on that "place." As a result, when a scoreboard or other system paired with a place generates a trigger, the media system 302 can identify the event that is running at that time and at that "place," and can associate the trigger to that event.

The media system 302 can detect a trigger by interacting with the application or website associated with the provider of the media system 302 that is installed and/or being executed on a device (e.g., a user device 306 and/or a media capture device 304). For example, the application or website can generate a trigger in response to user input (e.g., on a user device 306, on a media capture device 304, and/or on a trigger device 308), and can send the trigger to the media system 302 (e.g., through the Internet, a wireless network, a wired network, and/or other suitable communications network). In some cases, a trigger generated by a trigger device 308 can be sent to the media system 302 without using the application or website installed on or executed by a user device 306 and/or a media capture device 304.

In some implementations, different click patterns (received through an interface of a user device 306, a media capture device 304, and/or a trigger device 308) can be defined and associated with different moments during the event. In one illustrative example, a double click can be associated with a goal scored during a sporting event, and a long click (e.g., longer than 1 second) can be associated with a penalty during the sporting event.

As noted above, the trigger detection engine 312 can also detect automatically-generated triggers. Triggers can be automatically generated based on information indicating that a moment of interest may have occurred during the event. In some examples, the application, website, or other platform associated with the provider of the media system 302 (e.g., installed on a user device 306 or a media capture device 304) can be configured to automatically generate triggers based on detection of an occurrence during the event, based on one or more characteristics of a user of a device located at the site during the event, based on one or more characteristics of a user observing the event remotely, any combination thereof, and/or other indication of a significant occurrence during the event. For instance, an occurrence during an event that can cause an automatic generation of a trigger can include a score change during a sporting event (e.g., detected using scoreboard data, as described below, or other data), a player substitution during a sporting event, a significant time change (e.g., end of a quarter or half of an event, end of the event itself, intermission of a play or musical event, or other significant time change), a penalty during a sporting event, an audio level during the event (e.g., loud noise, such as cheering, a buzzer, a bell, or the like).

The different occurrences during an event that can cause an automatic generation of a trigger can be detected in various ways. For example, as described further below with respect to FIG. 4, a scoreboard can be interfaced through a software integration to the provider platform of the media system 302, through a hardware integration with a scoreboard interface device (which can include a hardware module) reading and interpreting the scoreboard output data, and/or through another type of interface. Data from the scoreboard can then be analyzed (e.g., in real-time as the data is generated, with normal delays due to transmission and processing of the data, or in near-real-time). Based on the analysis of the data, an automated trigger can be generated when certain conditions are met (e.g. the clock stopped, and x seconds later the home team's score has increased by 1, among other examples).

In some examples, the audio during an event can be monitored, and automated triggers can be generated in response to certain patterns, pitches, and/or other audio events. In some illustrative examples, a trigger can be automatically generated in response to detection of the sound of a golf club hitting a ball, in response to detection of a baseball bat hitting a ball, in response to detection of loud crowd cheering, in response to detection of a referee whistle, in response to detection of a keyword for a voice command, and/or in response to other audio events.

In some examples, an automated trigger can be generated based on detection of a jersey number, a face, or other identifying characteristic of a player involved in an event. For example, a user can input a jersey number of a favorite player into the application or website. In another example, the user can input a photograph of the favorite player. Other identifying characteristics of the favorite player can also be input to the application or website. Video sequences where that player is included can be detected based on detection of the identifying characteristics (e.g., detection of the jersey number or face using Computer Vision techniques, such as object and/or face detection). In one illustrative example, during a baseball game, a camera may be placed behind the home plate and the position of a player batting at home plate is such that the jersey number is clearly visible and steady. Such a setup allows a computer vision algorithm to analyze video frames of the batter, identify the jersey number, and generate an automated trigger based on the identified jersey number, causing the camera to capture and send to the media system 302 video of the batter during the at-bat.

Characteristics of a user of a device located at the site during the event or a user observing the event remotely can include a biometric event associated with the user (e.g., a change in blood pressure, a change in temperature, increased perspiration, increased and/or rapid breathing, and/or other biometric event), movement by the user (e.g., clapping, jumping up, high fiving, and/or other movement), an audio level of the user (e.g., a volume associated with yelling, or the like), any combination thereof, and/or other suitable user characteristic. The characteristics of the user can be measured using a biometric sensor (e.g., a biometric sensor of a wearable biometric sensing device, of a smartwatch, of a fitness tracker, of a user device 306, of a media capture device 304, or other suitable device), using motion sensors of a device (e.g., motion sensors of a user device 306, of a media capture device 304, of a wearable device, or other suitable device), using a microphone or other audio sensor of a device (e.g., a microphone of a user device 306, of a media capture device 304, of a wearable device, or other suitable device), or using any other mechanism.

As noted above, biometric-based triggers can be generated based on a biometric event associated with the user of a device located at the site during the event or a user that is remotely observing the event. For example, a user's heart rate, pulse, temperature, breath rate, and/or other indicators (e.g., selected by the user) can be detected, and when a change is detected that corresponds to a predefined pattern, an automated trigger can be generated to capture the moment that led the physical reaction. In some cases, initially a default pattern can be used, and as more biometric data is obtained for the user (e.g., using a wearable device), the patterns can be trained for the user's body. In some implementations, biometric-based triggers can be generated based on biometric indicators of other people associated with the event, such as a player that is participating in an event (e.g., a basketball player during a basketball game), a coach of a team participating in an event, or other people located at the site or remotely observing the event.

In some examples, an automatically generated trigger can be generated based on a pattern of hand clapping of a user. The hand clapping pattern can be detected by a wearable device (e.g., a smartwatch, a fitness tracker, or other device) that can be paired with the application or website associated with the provider of the media system 302.

The media system 302 (e.g., using the trigger detection engine 312) can associate the detected triggers with the event, with corresponding times in the event, and/or with one or more media capture devices 304 or other media sources. The trigger data for the detected triggers can be stored for later use (e.g., for selecting candidate media segments, for transmission to media capture device 304 for selecting candidate media segments, and/or for other use). For instance, the media system 302 can associate a detected trigger with the event, and can also associate the detected trigger with a time in the event that corresponds to the time at which the trigger was generated. In one illustrative example, the event can include a soccer game, and a trigger can be generated in response to a user selecting a button of a user device 306 (e.g., a virtual button in a graphical interface of the application associated with the provider of the media system 302 that is installed on the user device 306) at a time when a goal is scored. The media system 302 can detect the trigger, and can associate the trigger with the time corresponding to when the goal was scored.

The media system 302 is also configured to obtain media content (e.g., video, audio, images, and/or other media content) from one or more media capture devices 304. In some cases, the media system 302 receives media only from authenticated recording devices at the event. For example, the media system 302 may receive media captured for an event only from media capture devices 304 that have been authenticated with the media system 302 and/or that have been authenticated for the event. In some examples, the one or more media capture devices 304 can record and/or buffer the captured media. In such examples, the media system 302 can upload all of the stored media or a portion of the media at a later point in time. For example, the media capture device 304 can send the entire media content to the media system 302 (e.g., automatically or in response the media system 302 requesting the entire captured media content from a media capture device 304). In another example, the media system 302 can request specific clips of the captured media content from one or more of the media capture devices 304 (e.g., based on one or more detected triggers, as described in more detail below). In some cases, a media capture device 304 may only capture media content based on a trigger. For instance, a media capture device 304 may capture video, audio, and/or other media of an event upon receiving a trigger. In one illustrative example, the media capture device 304 can capture media (e.g., record video, audio, and/or other media) at the time the trigger was generated and a certain duration (e.g., x number of seconds) of media before and/or after the time the trigger was generated. The window of time for which the media capture device 304 is to capture media content (based on the time the trigger was generated plus the duration before and/or after) can be referred to herein as a media window size. In some examples, the media system 302 can receive a media stream (e.g., a video stream, and audio-video stream, an audio stream, or the like) from one or more of the media capture devices 304, in which case the one or more media capture devices 304 may or may not record and/or buffer the media content. The media stream can be provided to the media system 302 as the media content is being captured by the one or more media capture devices 304.

In some examples, device data can also be sent by a media capture device 304 to the media system 302 separately from or along with the media content. Device data associated with a media capture device 304 can include a device identifier (e.g., a device name, a device serial number or other numerical identifier, or other suitable identifier), an identifier of a user of the device if a unique user exists for the device (e.g., a name of the user, a numerical identifier of the user, or other suitable user identifier), sensor data that can be used to determine a stability of the media capture device 304 (e.g., whether the media capture device 304 is mounted (stable) and not handheld), and/or any other suitable data. The sensor data can be from any suitable type of sensor of a media capture device 304, such as an accelerometer, a gyroscope, a magnetometer, and/or other type of motion sensor. The media system 302 can store the device data for later use. In some cases, the media system 302 can associate the device data with a corresponding time in the event.

Figure 4:
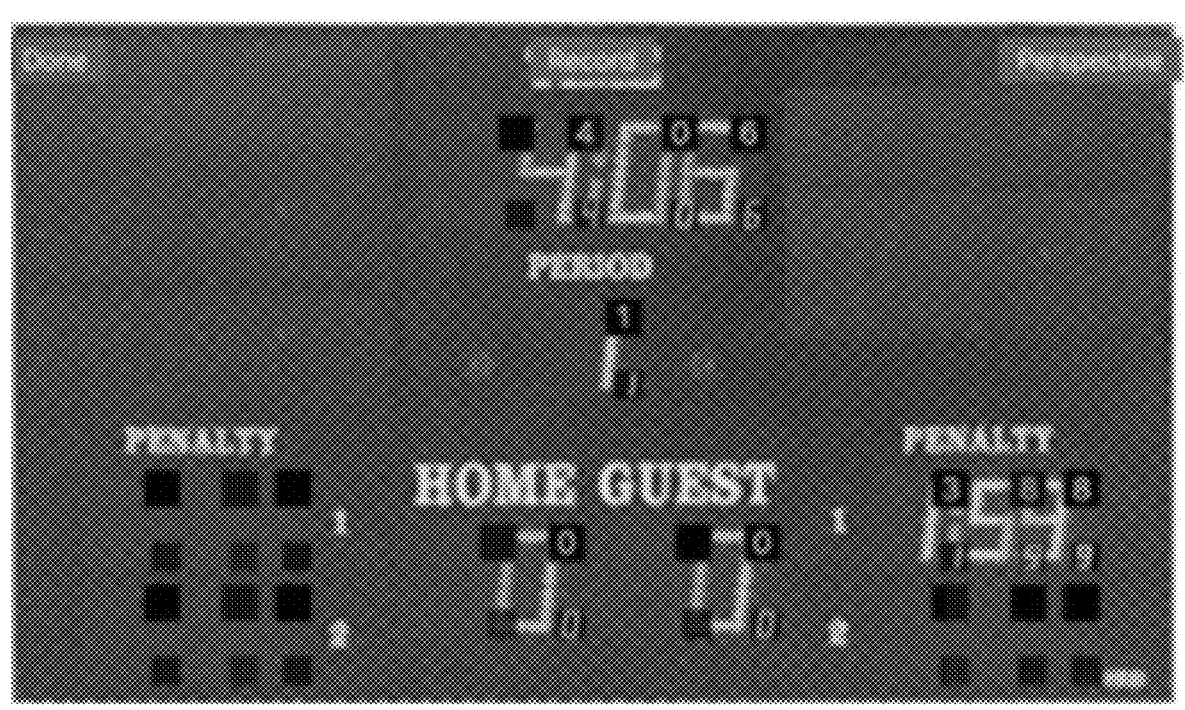
FIG. 4 is a diagram of a scoreboard providing information for use by a media system, in accordance with some examples.

In some implementations, the media system 302 can receive other data from user devices 306, from a scoreboard at the site hosting the event, and/or from other devices at the site, and can associate the other data with a corresponding time in the event. The other data can also be stored by the media system 302 for later use. FIG. 4 is a diagram illustrating an example of a scoreboard 400 at a sporting event. Scoreboard data from the scoreboard 400 can be provided to the media system 302. The scoreboard data can be used to detect a significant occurrence during the event (e.g., a score change, a player substitution, a significant time change such as the end of a quarter, half, or the event itself, a penalty, or the like), which can be used to automatically generate one or more triggers.

In some examples, a camera (e.g., of a media capture device 304 and/or user device 306) can be aligned with the scoreboard 400 in order to capture images or video of the scoreboard 400. In some cases, the application or website associated with the provider of the media system 302 (e.g., installed on and/or executed by a media capture device 304 and/or user device 306) can analyze the images of the scoreboard for changes in order to detect a significant occurrence during the event. In some cases, the application or website can send the images of the scoreboard (and/or the scoreboard data) to the media system 302, and the media system 302 can analyze the scoreboard data (or images) for changes in order to detect a significant occurrence during the event. For example, the images can be analyzed using computer vision techniques to determine a significant occurrence during the event. In some examples, a scoreboard can be integrated into the application or website associated with the provider of the media system 302 (e.g., installed on and/or executed by a media capture device 304 and/or user device 306). In such examples, the event can be synchronized with the scoreboard integrated into the application or website. For instance, as noted above, a trigger can be based on data from a third party system (e.g. a scoreboard) that can be paired indirectly with the event. In one illustrative example, the third party system can be paired with a "place" object in the system, and the place can be paired with an event for a given date and time. When an event is active on a given "place", all devices and/or systems paired to that "place" can provide data and/or triggers used in the context of that event.

In some examples, a scoreboard interface device can be connected to the scoreboard, and can interpret events that occur on the scoreboard, such as a clock stop, a clock start, a clock value, a home team score, a visitor team score, among others. In some cases, the scoreboard interface can be a standalone hardware device. The scoreboard interface device can be connected to and can relay the scoreboard information to the media system 302, a user device 306, and/or a media capture device 304 through a network. The media system 302, a user device 306, and/or a media capture device 304 can generate a trigger based on the scoreboard information.

Candidate media segments from the captured media can be selected based on the triggers detected by the trigger detection engine 312. A media segment can include a portion of an entire media content item captured by a media capture device 304. For instance, a media content item can include a video captured by a media capture device 304, and a media segment can include a portion of the video (e.g., the first ten seconds of the entire video, or other portion of the video). The portion of a media content item corresponding to a media segment can be based on a time at which a trigger is generated. For example, a trigger can be generated (e.g., by a user device 306, by a media capture device 304, by a trigger device 308, or automatically generated) at a point in time during an event. In response to the trigger, a certain portion of a media content item (corresponding to the point in time the trigger was generated) can be selected as a candidate media segment. For instance, the portion of the media content item used for the candidate media segment can include the media captured at the time the trigger was generated and the media captured a certain duration (e.g., x number of seconds) before and/or after the time the trigger was generated, resulting in a candidate media segment having a length of time approximately equal to the duration. In one illustrative example, a candidate media segment can include the media captured at the time the trigger was generated, plus the media captured ten seconds before the time the trigger was generated, resulting in a 10-11 second media segment. In another illustrative example, the portion of the media content item used for the candidate media segment can include the media captured at the time the trigger was generated, plus the media captured ten seconds before the time the trigger was generated and the media captured ten seconds after the generation time of the trigger, resulting in a 20-21 second media segment.

The coordination between the time a trigger is generated, the time in a media item (e.g., in a video), and the time in the event can be based on an absolute time value (e.g., provided by the network) and the time reference of the local devices (e.g., the media capture devices 304, the user devices 306, and/or the trigger devices 308). For example, in some cases, the time of a trigger is based on the absolute time value, which can be provided by a network server or other device (e.g., a cellular base station, an Internet server, or the like). The absolute time value can be denoted by a timestamp. Network connected devices by design provide a reliable and accurate time reference through the network (e.g., cellular network, WiFi network, or the like), which is then available to the application. The media capture device 304 can receive from the server the absolute time value of the trigger, as well as the media window size (e.g., trigger time −5 s, trigger time +20 s, or other window size), and can capture or provide the corresponding media. When a media capture device 304 has an accurate time reference and is also running the application associated with the media system 302, the absolute timestamp provided by a network server can be mapped directly to the local video using a timestamp of the local media capture device 304.

In one illustrative example, a media capture device 304 can be a smartphone running the application associated with the provider of the media system 302. In such an example, there is no lag or minimal lag between the video being captured (which is available to the application at that time)

and its absolute time reference provided by the network. In another illustrative example where the camera is physically separate from the device or server running the application associated with the provider of the media system 302, the video has to be transmitted to the server running the application. In such an example, when the application receives the trigger with the absolute timestamp, the application can use the local server time reference to perform the trigger. However, the application may not automatically offset for the delay it takes the video and/or trigger to travel from the camera to the server. When such an offset is not adjusted for, the result is that the moment captured in a video segment shows a video captured earlier in time than expected. Techniques are provided to correct for such a delay. In one illustrative example, a fixed offset can be input (e.g., manually input, automatically input, etc.) to the server that applies to all videos coming from a given media capture device 304 or on all media capture devices 304 for a given event. For instance, the server can apply the offset to all videos when extracting video segments based on obtained triggers. In another illustrative example, an identifying pattern (e.g., a QR code, barcode, image, or other identifying pattern) showing the instant absolute time value available can be filmed by any of the media capture devices 304, and the server engine of the media system 302 can automatically detect that identifying pattern, interpret the corresponding time value of the identifying pattern, compute the required offset, and define that as the offset for that camera feed or all camera feeds for the corresponding event. As a result, when a trigger is generated, the application will receive the absolute timestamp and the value of the computed offset to clip the correct video segment, taking into account the delay specific to that specific media stream.

In another illustrative example, an artificial intelligence application or algorithm (e.g., using machine learning, such as a neural network) can be used to determine the offset that will be applied to one or more media content items (e.g., a video) when extracting media segments based on obtained triggers. For example, using techniques described below, the motion of one or more objects captured in a media segment can be analyzed relative to an obtained trigger to obtain the offset between the trigger and the motion which likely generated the trigger. Using the results of analysis of multiple captured media segments from a media stream, an estimated offset can be generated. For example, if the majority of the motion captured in the media segments occurs at approximately the same time relative to the corresponding trigger in each of the captured media segments, the time may be defined as the offset for the media stream. The offset relative to the corresponding trigger may continue to be analyzed to further improve the accuracy of the offset or to adjust for drift in the offset for a specific media stream.

In some implementations, the media system 302 can receive the media captured by one or more of the media capture devices 304 (e.g., as a media stream, or after the media is stored by the one or more media capture devices 304), and can extract the candidate media segments from the received media using the detected triggers. For example, the media segment analysis engine 314 can extract media segments from media (e.g., video segments from captured video) received from one or more media capture devices 304, where the extracted video segments correspond to triggers from one or more trigger sources (e.g., triggers generated by user devices 306, triggers generated by media capture devices 304, triggers generated by trigger devices 308, and/or automatically-generated triggers).

As noted above, the media system 302 can associate a detected trigger with a time in the event that corresponds to the time at which the trigger was generated. The media segment analysis engine 314 can extract portions of the received media based on the times associated with the triggers. For instance, a time associated with a trigger can be used by the media segment analysis engine 314 to identify the portion of the received media to extract as a candidate media segment. Using the example from above, a portion of media content that will be selected as a candidate media segment can include the media captured at the time the trigger was generated and the media captured a certain duration (e.g., x number of seconds) before and/or after the time the trigger was generated, resulting in a candidate media segment having a length approximately equal to the duration.

In some implementations, the media system 302 can communicate detected triggers to the media capture devices 304, and can receive media segments corresponding to the triggers. In such implementations, the media capture devices 304 can select the candidate media segments using the triggers. For example, the media system 302 can send the one or more detected triggers to one or more of the media capture devices 304, and the media capture devices can select the candidate media segments using the triggers. In some cases, the media system 302 can also send the times that are associated with the triggers (e.g., a first time associated with a first trigger, a second time associated with a second trigger, and so on). The media capture devices 304 can select the candidate media segments in the same way as that described above for the media system 304. For example, a time associated with a trigger can be used by a media capture device 304 to identify the portion of the received media to extract as a candidate media segment. Once a media capture device 304 has selected one or more candidate media segments (based on one or more received triggers), the media capture device 304 can send the selected one or more media segments to the media system 302 for analysis. In the event multiple media capture devices 304 extract candidate media segments from the different media content items (e.g., different videos) captured by the different media capture devices 304, all of the media capture devices 304 can send their respective candidate media segments to the media system 302 for analysis.

The media system 302 can associate received media content and associated device data with a corresponding event. For example, the media system 302 can store video content received by a media capture device 304 with device data of the media capture device 304. The video content and the device data can be associated with the event for which the video was captured. As noted above, the device data can include a device identifier, an identifier of a user of the device if a unique user exists for the device, sensor data that can be used to determine a stability of the media capture device 304, any combination thereof, and/or any other suitable data.

The media system 102 can evaluate the candidate media segments to determine which media segments to include in the collection of media content. For example, the quality metric engine 316 can analyze the candidate video segments to determine qualities of the candidate video segments. Quality data can be associated with the candidate video segments (e.g., quality data of a first video segment can be stored in association with the first video segment, quality data of a second video segment can be stored in association with the second video segment, and so on). The highest quality candidate media segments can be selected for inclusion in a collection of media content.

The quality data of a media segment can be based on one or more quality metrics determined for the media segment. The quality metrics determined for a media segment can be based on factors that are indicative of the level of interest a media segment might have to users. One example of a quality metric for a video segment (or other media segment) is an amount of motion of one or more objects captured in the media segment. For instance, a media capture device 304 can capture video of a sporting event that includes players on a field. The players can move around the field during the sporting event. A candidate video segment can include a portion of the captured video (e.g., a ten second segment of the captured video). The candidate video segment can include multiple video frames, where players are moving from frame to frame. The amount of motion of the players in the video segment can be determined, and can be used as a quality metric. For example, more motion (e.g., greater than a motion threshold) is associated with a higher quality, due to more motion indicating that one or more objects of interest (e.g., the players) are captured by the video. No motion or a small amount of motion (e.g., below a motion threshold) can be associated with a lower quality, since no motion or little motion indicates that one or more objects of interest are not captured by the video. For example, no motion in the video segment can indicate that no players are present in the video segment, in which case a moment of interest during the sporting event (as indicated by a trigger that caused the video segment to be extracted as a candidate video segment) was not captured by the video segment.

An amount of motion of one or more objects in a video segment can be determined the by the quality metric engine 316 using any suitable technique. For example, optical flow between frames of a candidate video segment can be used to determine movement of pixels between the frames, which can indicate an amount of motion that occurs in the video segment. In some cases, an optical flow map can be generated at each frame of a video segment (e.g., starting at a second frame of the video segment). An optical flow map can include a vector for each pixel in a frame, with each vector indicating a movement of a pixel between the frames. For instance, an optical flow can be computed between adjacent frames to generate optical flow vectors, and the optical flow vectors can be included in an optical flow map. Each optical flow map can include a two-dimensional (2D) vector field, with each vector being a displacement vector showing the movement of points from a first frame to a second frame.

Any suitable optical flow process can be used by the quality metric engine 316 to determine motion or movement of one or more objects in a video segment. In one illustrative example, a pixel I(x, y, t) in a frame M of a video segment can move by a distance ($\Delta$x, $\Delta$y) in a next frame M+t taken after a certain time $\Delta$t. Assuming the pixels are the same and the intensity does not change between the frame M and the next frame M+t, the following equation can be assumed:

$$I(x, y, t) = I(x + \Delta x, y + \Delta y, t + \Delta t).$$

Equation (1)

By taking the Taylor series approximation of the right-hand side of Equation (1) above, and then removing common terms and dividing by $\Delta$t, an optical flow equation can be derived as:

$$f_x u + f_y v + f_t = 0,$$

Equation (2)

$$\text{where: } f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.,$$

Using the optical flow equation (Equation (2)), the image gradients $f_x$ and $f_y$ can be found along with the gradient along time (denoted as $f_t$). The terms u and v are the x and y components of the velocity or optical flow of I(x, y, t), and are unknown. The optical flow equation cannot be solved with two unknown variables, in which case any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of an image pixel) is small and approximately constant in a local neighborhood of the pixel I, and solves the basic optical flow equations for all the pixels in that neighborhood using the least squares method.

Other techniques can also be used to determine an amount of motion of one or more objects in a video segment. For instance, color based techniques can be used to negatively determine motion. In one illustrative example, if a media capture device 304 is filming one side of an ice rink, and that side becomes empty because players are on the other side of the ice rink, the quality metrics engine 316 can identify that the amount of white color is dominant in those video frames. Based on detection of the dominant amount of white color, the quality metrics engine 316 can determine there is no motion (or little motion) in the video being captured. The amount of white color (e.g., based on pixel intensity values) can be compared to a threshold to determine whether the white color is dominant and thus that motion is present or not present. In one illustrative example, the threshold can include a threshold number of pixels with a white pixel value (e.g., a value of 255 in a pixel value range of 0-255). For example, if the amount of white color is greater than the threshold, it can be determined that there is no motion or little motion in the scene. When the amount of white color is less than the threshold, the quality metrics engine 316 can determine that there is motion in the video being captured. While white is used an example of a color, any suitable color can be used (e.g., based on the type of event). For instance, for other types of events (e.g., soccer, football, field hockey, lacrosse, etc.), the color can be set to green.

In some examples, the amount of motion of one or more objects captured in a media segment can be quantified as a motion score. The motion score can be a weighted motion score. For example, when a media segment is extracted from a video a certain duration (e.g., x number of seconds) before the time a trigger was generated, lower weights can be used for the earlier portions of a media segment and higher weights can be used for later portions of the media segment because most of the action corresponding to a trigger typically occurs towards the end of the clip, which is closer to when the trigger was generated. In such an example, motion detected in an earlier part of the video segment will be given less weight than motion detected in a later part of the video segment. In one illustrative example, a video segment can include 300 frames (denoted as frames 1-300, and corresponding to a ten second video clip at 30 frames per second). Each of the frames 1-100 can be assigned a weight of 0.15, each of the frames 101-200 can be assigned a weight of 0.35, and each of the frames 201-300 can be assigned a weight of 0.5. Using the detected motion between frames multiplied by the weights over time, a motion score can be calculated for the video segment. In another example, when a media segment is captured a certain duration (e.g., x number of seconds) before the time a trigger was generated and a certain duration (e.g., x number of seconds) after the time a trigger was generated, lower weights can be used for the beginning and the end of a media segment, and higher weights can be used for the middle of the media segment, which is closer to when the trigger was generated.

Another example of a quality metric for a video segment (or other media segment) is a motion of a media capture device 304 when capturing the video segment. For example, a priority of a media capture device 304 for use in a collection of media content can be based on a stability of the media capture device 304. As described above, the device data stored for a media capture device 304 can include sensor data that can be used to determine a stability of the media capture device 304. The sensor data can be used to determine whether the media capture device 304 is stable (e.g., due to being mounted on a tripod or other mount, as opposed to being handheld). The stability of a media capture device 304 can be used along with the quality metric based on motion of one or more objects in a video segment, because a media capture device that is handheld (e.g., a mobile phone with a camera) can shake as the video is captured, which would also generate a high motion score. The stability-based priority can help to offset such an issue. For example, if a media capture device 304 is determined to be stable, and a video segment extracted from a video captured by the media capture device 304 is determined to have a high motion score, the quality metric engine 316 can determine that the motion detected for the media segment is actual motion of objects, as opposed to movement of the media capture device 304 itself.

In some cases, a stability threshold can be used to determine whether a media capture device 304 is stable or is not stable. For instance, sensor data can be obtained by the quality metric engine 316 from one or more sensors (e.g., accelerometer, gyroscope, magnetometer, a combination thereof, and/or another type of sensor) of a media capture device 304. In some cases, the application associated with the provider of the media system 302 can obtain the sensor data from the media capture device 304, and can send the sensor data to the media system 302. In one illustrative example, the sensor data can include pitch, roll, and yaw, corresponding to the rotation around the x-, y-, and z axes of a three-dimensional space. In some implementations, sensor data for the period of time corresponding to a media segment (e.g., the readings from the one or more sensors over the period of time of the media segment) can be obtained. The quality metric engine 316 can compare the sensor data to the stability threshold to determine whether a media capture device 304 is stable or is not stable. If the sensor data indicates movement below the stability threshold (indicating little to no movement), the media capture device 304 can be determined to be stable. On the other hand, if the sensor data indicates movement above the stability threshold (indicating more movement than desired), the media capture device 304 can be determined as not being stable. A media capture device 304 that is stable (e.g., determined based on the sensor data) is associated with a higher quality than other media capture devices that are determined not to be stable. Media capture devices that are determined to be stable (and thus that have higher quality) will be prioritized over media capture devices that are considered not to be stable.

In some cases, the device sensors can expose real time data that is interpreted in real time (e.g., as the data is generated and received) by the application and translated into a score (e.g., a motion score). When a trigger is performed, the application can retrieve the latest score value (e.g., a motion score value), verify whether the score is above or below the threshold of quality, and upload the corresponding video clip with an associated quality or priority tag. In some cases, the tag can include the score. When the server application processes all received videos to rank and also to later process the collection of media content (e.g., highlight reel), the server application can read those tags to prioritize each video.

Another example of a quality metric for a media segment (e.g., video segment or any other media segment) is a number of triggers associated with the media segment. For example, a first video segment corresponding to a greater number of triggers than a second video segment indicates that there is more interest in the first video segment than the second video segment. In such an example, the first video segment can be considered to have a higher trigger-based quality than the second video segment.

Another example of a quality metric is based on presence of a particular object in a media segment. Such an object can be referred to herein as an object of interest. For instance, a player in a particular sporting even can be determined to be an object of interest, and a media segment with media associated with that player can be prioritized over media segments that are not associated with that player. In one illustrative example, a video segment including the player during the event can be prioritized over other video segments that do not include the player. In some cases, an object of interest can be determined based on user input. For instance, a user can provide input (e.g., using a user device 306, a media device 304, or other device) indicating that a particular object is of interest to that user. In response to the user input, the quality metric engine 316 can flag or otherwise identify media segments that include the object of interest. In some cases, an object of interest can be identified automatically. For instance, a player on a team can be pre-defined as an object of interest, and media segments of that player can be assigned a higher priority than media segments that do not include that player.

An object of interest can be identified in a media segment using any suitable technique, such as using object recognition for video, audio recognition for audio, and/or any other suitable type of recognition or identification technique. In one illustrative example, a player can be designated as an object of interest. Face recognition can be performed on video frames to identify if the player is present in the video frames. In another example, object recognition can be performed to determine a jersey number of the players in video frames, and the jersey number assigned to the player can be identified based on the results of the object recognition. The object recognition can include an object character recognition algorithm, or any other type of object recognition that can recognize numbers in video frames.

The quality metric engine 316 can associate the candidate media segments with data from all data sources, such as media segment quality data (e.g., motion in view, stability, number of triggers, and/or other quality data), device data (e.g., user identifier, motion sensor data, and/or other device data), time-based data (e.g., scoreboard data or other time-based data), trigger-based data (e.g., identification of users per trigger, total number of triggers, and/or other trigger-based data).

Figure 5:
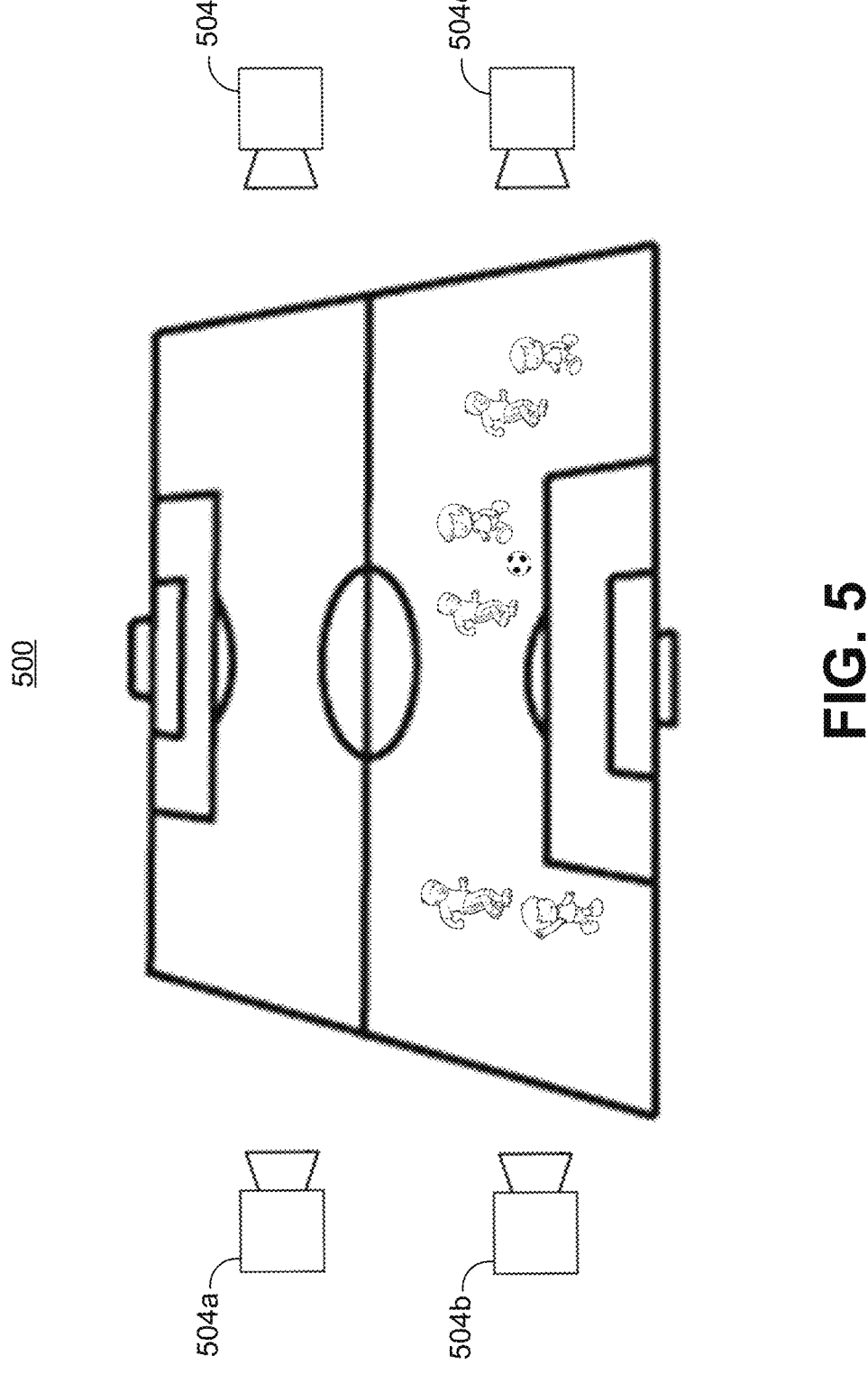
FIG. 5 is a diagram illustrating another example of a site at which an event is taking place, in accordance with some examples.

As noted above, the determined qualities of the different media segments can be used to determine which media segments will be included in a collection of media content (e.g., a highlight reel of the event). For example, there may be multiple media capture devices 304 capturing video of an event at the same time. FIG. 5 is a diagram illustrating an example of a site 500 at which an event is taking place. As shown, the event is a soccer game, and there are four video capture devices 504a, 504b, 504c, and 504d arranged in different locations around the site 500. The video capture devices 504a, 504b, 504c, and 504d provide different camera angles and viewpoints of the event. A trigger can generated at the point in time during the soccer game that is shown in FIG. 5. Based on the generation of the trigger, candidate video segments corresponding to that point in time, and a certain duration before and/or after the time the trigger was generated, can be extracted from video captured by all of the video capture devices 504a, 504b, 504c, and 504d.

Quality metrics determined for the extracted media segments can be compared to determine which of the candidate media segments from the different video capture devices 504a-504d will be included in a collection of media content corresponding to the event (e.g., a highlight reel of the event, a group of video clips, and/or other suitable media collection). For example, as shown in FIG. 5, the players on the field are located in the bottom half of the field, which is within the fields of view of the two video capture devices 504b and 504d. There are no players in the top half of the field, which is within the field of view of the two video capture devices 504a and 504c. Based on the players being in the fields of view of the two video capture devices 504b and 504d, the amount of motion of the players captured in the video segments from the video capture devices 504b and 504d will be higher than the motion of any objects in the video segments from the video capture devices 504a and 504c. As a result, the video segments from the video capture devices 504b and 504d will have higher motion scores than the video segments from the video capture devices 504a and 504c. The video segments with higher motion scores can be prioritized for use in the collection of media content.

The stability of the video capture devices 504a, 504b, 504c, and 504d can also be determined. For instance, sensor data from the video capture devices 504a, 504b, 504c, and 504d can be analyzed by the quality metric engine 316, which can determine whether the sensor data indicates movement above or below the stability threshold. In one illustrative example, the video capture devices 504b and 504c can be considered stable (e.g., on a tripod or other stabilization mechanism) based on the sensor data for the video capture devices 504b and 504c indicating movement below the stability threshold, whereas the video capture devices 504a and 504d can be considered as not being stable (e.g., due to the devices being handheld) based on the sensor data for the video capture devices 504a and 504d indicating movement above the stability threshold. The stable video capture devices 504b and 504c can be prioritized for use in the collection of media content over the less stable video capture devices 504a and 504d.

The media collection generation engine 318 can then select the video segments from the video capture devices 504a, 504b, 504c, and 504d for inclusion in the collection of media content based on the motion scores and the stability-based priorities. For example, the video capture devices 504b and 504c will be prioritized over the video capture devices 504a and 504d, due to the video capture devices 504b and 504c being stable. The media collection generation engine 318 can then select the video capture device 504b over the video capture device 504c, due to the video segment from the video capture device 504b having a higher motion score than the video segment from the video capture device 504d. Such a result will provide a high quality video segment (e.g., with better image stabilization) of the action associated with the generated trigger.

The media system 302 can generate a collection of media content including media segments that are selected based on the data associated with the candidate media segments. For example, the media collection generation engine 318 can automatically create a highlight reel using the media segment quality data (based on the determined quality metrics). In one illustrative example, the media collection generation engine 318 can identify a subset of the most relevant video segments based on total number of triggers, and can select from the subset the best video segments for each trigger based on the media segment quality data.

A collection of media content can include multiple shortened clips (corresponding to media segments) of captured media content from the different media capture devices located around an event. The group of selected media segments can have different characteristics, which can be based on the characteristics or settings of the media capture devices when the media segments were captured. For instance, video segments in a collection of media content can be from different points in time (corresponding to the triggers generated throughout the event), can be from different viewpoints of a site (corresponding to the different media capture devices used to capture the video segments), can have different zoom amounts or other display characteristics, can have different audio characteristics (e.g., based on different audio captured at different points in time), can have any suitable combination thereof, and/or can have any other suitable variations from media segment to media segment in the collection.

In some examples, a collection of media content can include a moment-based highlight reel. A moment-based highlight reel can be generated on a user basis, and can include media segments corresponding to all triggers generated by a device of that user during an event. For instance, if a user generates ten triggers by selecting a trigger icon in the application installed on a user device ten times, then a moment-based highlight reel can include ten media segments that were generated based on those ten triggers. The ten media segments will correspond to moments in the events that occurred around the time the triggers were generated, and can be displayed sequentially in time (e.g., the earliest media segment is displayed first, followed by the next media segment in time, and so on). For each moment in time, the highest quality media segment (determined using the quality metrics described above) will be selected for the moment-based highlight reel.

In some examples, a collection of media content can include an event-based highlight reel. For example, the media segments corresponding to moments during an event that had the largest number of triggers can be selected for inclusion in the event-based highlight reel. In another example, media segments can be selected for inclusion in the event-based highlight reel based on the number of times those media segments have been shared by users with other users. For instance, a given user may share a media segment with other users by, for example, emailing the other users with the media segment, texting (e.g., using SMS or other texting platform) the other users with the media segment, messaging the other users with the media segment, tagging the other users with respect to the media segment, and/or sharing mechanism. Media segments that are shared more often than other media segments can be selected for inclusion in the event-based highlight reel over the other segments. In some cases, media segments can be selected for inclusion in an event-based highlight reel based on a particular object of interest being present in the media segments. For example, a player of interest can be determined (e.g., based on user input, based on frequency of occurrence of that object in the video segments, and/or based on other factors), and the media segments can be analyzed to determine the presence of the object of interest. A media segment that includes the object of interest can be selected for inclusion in an event-based highlight reel over other segments that do not include the object of interest.

In some cases, metadata associated with a media segment can also be taken into account when generating an event-based highlight reel. For example, while a media segment corresponding to particular moment during an event may have a small number of triggers associated with it (e.g., only a single trigger, two triggers, or the like), a user may input metadata into their device indicating that moment was a goal during a sporting event. In another example, scoreboard data may be used to determine that the media segment corresponds to a moment in a game when a goal was scored. Based on the metadata indicating the moment corresponds to a goal, the corresponding media segment can be automatically included in the event-based highlight reel for that game. Any combination of the above-described factors can be analyzed to determine which video segments to include in an event-based highlight reel.

Once a collection of media content is generated, the media system 302 can then provide the collection of media content (e.g., a highlight reel) to authenticated users. For example, authenticated users that have the application associated with the provider of the media system 302 installed on their devices can access the collection of media content through an interface of the application. In another example, the users can access the collection of media content through a website associated with the provider of the media system 302. In some examples, a user can store and/or share the collection of media content within the application or website, or outside of the application or website (e.g., on a social networking website or application, or other suitable platform), with other users that are associated with the user (e.g., are "friends" of the user).

Figure 6:
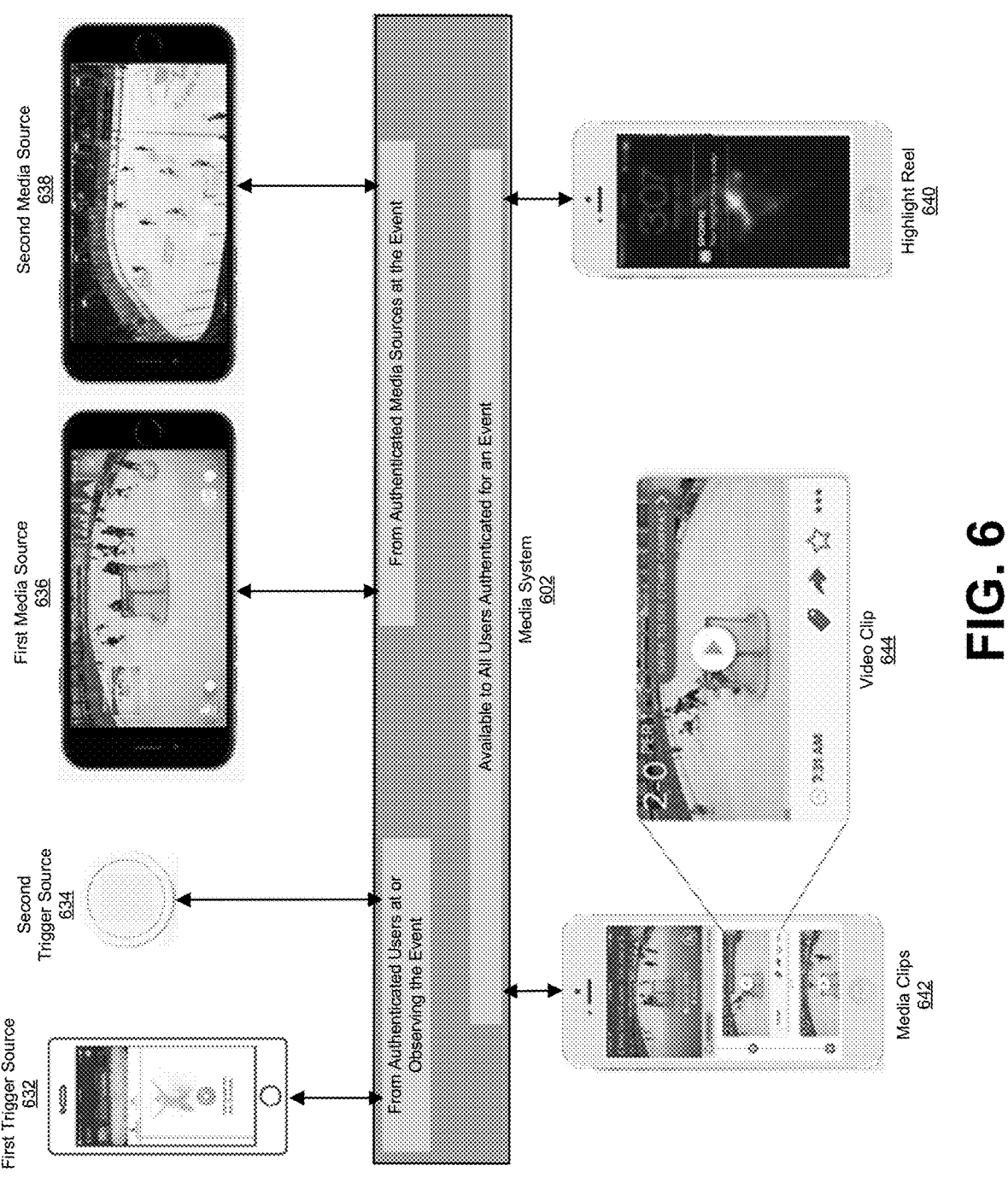
FIG. 6 is a diagram illustrating an example use case of a media system for generating a collection of media content, in accordance with some examples.

FIG. 6 is a diagram illustrating an example use case of a media system 602 for generating a collection of media content for an event. The event can include a hockey game. Triggers generated by authenticated users at the event and/or by authenticated users observing the event remotely can be received by the media system 602. For example, triggers can be generated by a first trigger source 632 and a second trigger source 634. In some cases, triggers can also be automatically generated during the event, as previously described. Media content can be captured by authenticated media sources (e.g., media capture devices 304) at the event, and can be received by the media system 602. For example, a first media source 636 and a second media source 638 can be used to capture media content (e.g., video, audio, and/or images) of the event.

In some cases, to create a highlight reel 640 of the event, the media system 602 can retrieve media segments associated with one or more moments within the event, associated with a user, associated with a player, associated with a team, associated with a location, and/or associated with other features of the event. The media system 302 can select candidate media segments based on triggers generated by a device of a specific user (the first trigger source 632 or the second trigger source 634), based on triggers generated by devices of all users authenticated with the event (e.g., the first trigger source 632 and the second trigger source 634), based on a certain time in the event, based on an object in view (e.g., a particular athlete participating in the event), or the like. The media system 302 can then select the best media capture device (e.g., the first media source 636 or the second media source 638) for each media segment in the highlight reel. For example, as described above, the media segments can be prioritized or ranked based on motion in view (e.g., weighted over time) of the media capture devices used to capture the media segments, based on the motion or stability of the media capture devices, based on the presence of a particular object in the media segments, and/or based on other factors. The highlight reel 640 can include an event-based highlight reel or a moment-based highlight reel. In some cases, an event-based highlight reel can be generated for the event, and a moment-based highlight reel can be generated for each authenticated user that caused one or more triggers to be generated (e.g., by clicking a trigger button in the application or website associated with a provider of the media system 602) during the event.

The media system 602 can also provide media clips 642 corresponding to some or all of the media segments captured during the event. For example, the video clip 644 corresponds to a video segment of a moment that occurred during the event at 7:31 am. The media clips 642 and the highlight reel 640 can be made available to all users that are authenticated for the event.

Using the above-described media generation techniques, high quality collections of media content can be generated for events. For example, the most relevant and the highest quality media segments can be automatically selected for inclusion in a highlight reel for an event.

FIG. 7 is a flowchart illustrating an example of a process 700 of generating media content using the techniques described herein. At block 702, the process 700 includes detecting, by a server computer, a trigger from a device. The trigger is associated with an event at the site. For example, in some cases, an event tag can be included with the trigger to indicate which event the trigger is associated with. In some cases, the server computer can be part of the media system (e.g., the media system 302). The device does not capture media segments for the server computer. For example, the device can include a user device (e.g., user device 306) or a trigger device (e.g., trigger device 308) that does not provide media content to the server computer (e.g., of the media system 302). In some examples, the device is located at the site. In some examples, the device is located at a location remote from the site. In some examples, the trigger is generated in response to user input obtained by the device. For instance, a user can press or otherwise select a virtual button of a graphical interface of an application or website associated with the server computer, and the device can generate a trigger in response to selection of the virtual button. In other examples, the user can select a physical button, perform one or more gesture inputs, speak one or more voice inputs, and/or use another selection mechanism to generate a trigger.

In some examples, the trigger can be automatically generated by the device based on at least one or more of detection of a moment during the event and a characteristic of a user during the event. For instance, a moment or occurrence during an event that can cause an automatic generation of a trigger can include a score change during a sporting event, a player substitution during a sporting event, a penalty during a sporting event, a significant time change during an event, an audio level during the event. Characteristics of a user of a device located at the site during the event or a user observing the event remotely can include a biometric event associated with the user, movement by the user, an audio level of the user, any combination thereof, and/or other suitable user characteristic.

At block 704, the process 700 includes obtaining, by the server computer, media segments of media captured by a plurality of media capture devices located at the site. At least one media segment of the obtained media segments corresponds to the detected trigger. For example, the at least one media segment can be captured, recorded, and/or sent to the sever computer in response to the detected trigger. In some cases, a media segment that does not correspond to a trigger is not obtained by the server computer. For example, in some cases, only media segments that triggers have been generated for are obtained by the media server.

In some examples, the media segments can be obtained by the server computer by extracting the media segments from streams of media received by the plurality of media capture devices. For example, obtaining the media segments can include receiving a first stream of media captured by a first media capture device of the plurality of media capture devices, receiving a second stream of media captured by a second media capture device of the plurality of media capture devices, and extracting a first media segment from the first stream of media and a second media segment from the second stream of media.

In some examples, the media segments can be obtained by the server computer in response to triggers sent to media capture devices. For instance, a media capture device can send a media segment to the server computer in response to receiving a trigger (e.g., from the media system, from a media capture device, from a user device, and/or from a trigger device). In one illustrative example, the trigger can be a first trigger, in which case the process 700 can further include detecting a second trigger that is associated with the event at the site. In such an example, a first media segment (e.g., obtained by the server computer) can correspond to the first trigger and a second media segment (e.g., obtained by the server computer) can correspond to the second trigger. Continuing with this example, obtaining the media segments can include sending, by the server computer, the first trigger to a first media capture device of the plurality of media capture devices. The first trigger causes the first media segment to be extracted from media captured by the first media capture device. The server computer can also send the second trigger to at least one of the first media capture device and a second media capture device of the plurality of media capture devices, where the second trigger causes the second media segment to be extracted from media captured by at least one of the first media capture device and the second media capture device. For example, the second trigger can be sent to the first media capture device, to the second media capture device, or to both the first and second media capture devices. Either the first media capture device, the second media capture device, or both the first and second media capture devices can extract the second media segment from the captured media. The server computer can receive the extracted first media segment and the extracted second media segment from at least one of the first media capture device and the second media capture device.

In some examples, the process 700 can associate, by the server computer, the first trigger and the second trigger with a time in the event at the site. In such examples, the obtained media segments correspond to times associated with the first trigger and the second trigger. The time associated with a trigger can be used to determine a particular media segment to extract based on that trigger.

At block 706, the process 700 includes determining, by the server computer, one or more quality metrics of each media segment of the obtained media segments. Quality metrics of a media segment can be determined based on a first motion of an object captured in the media segment, based on a second motion of a media capture device used to capture the media segment, or based on both the first motion and the second motion. In some cases, a quality metric of the media segment can be based on presence of an object in the media segment (e.g., presence of a person in the media segment, presence of a jersey number of a player in the media segment, or other object) in addition to or as an alternative to the first motion and/or the second motion.

At block 708, the process 700 includes selecting a subset of media segments from the obtained media segments. The subset of media segments can be selected based on the one or more quality metrics determined for each media segment of the obtained media segments. For example, the quality metrics of the different obtained media segments can be analyzed to determine which media segments are of the highest quality. In some cases, the subset of media segments is further selected based on a number of triggers associated with each media segment in the subset of media segments.

In some examples, the process 700 can select the subset of media segments from the obtained media segments by obtaining a first media segment of the event captured by a first media capture device and obtaining a second media segment of the event captured by a second media capture device. The first media segment and the second media segment can be captured at a same time and from different perspectives in the event. The process 700 can determine an amount of motion of one or more objects captured in the first media segment is greater than an amount of motion of one or more objects captured in the second media segment. The process 700 can select the first media segment based on the amount of motion of the one or more objects captured in the first media segment being greater than the amount of motion of the one or more objects captured in the second media segment. In some cases, a motion score can be used to select the subset of media segments, as described above. For example, the media segments with higher motion scores can be prioritized for use in the collection of media content.

At block 710, the process 700 includes generating a collection of media segments including the subset of media segments. In some examples, the process 700 can include providing the collection of media segments to one or more devices.

In some examples, the process 700 may be performed by a computing device or an apparatus. For example, the process 700 may be performed by the media system 302 shown in FIG. 3. In some cases, the computing device or apparatus may include a processor, microprocessor, microcomputer, or other component of a device that is configured to carry out the steps of the process 700. The computing device may include a memory configured to store data (e.g., media data, trigger data, authentication data, and/or any other suitable data) and one or more processors configured to process the data. The computing device may also include one or more network interfaces configured to communicate data. The network interface may be configured to communicate network based data (e.g., Internet Protocol (IP) based data or other suitable network data).

Process 700 is illustrated as a flowchart or logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
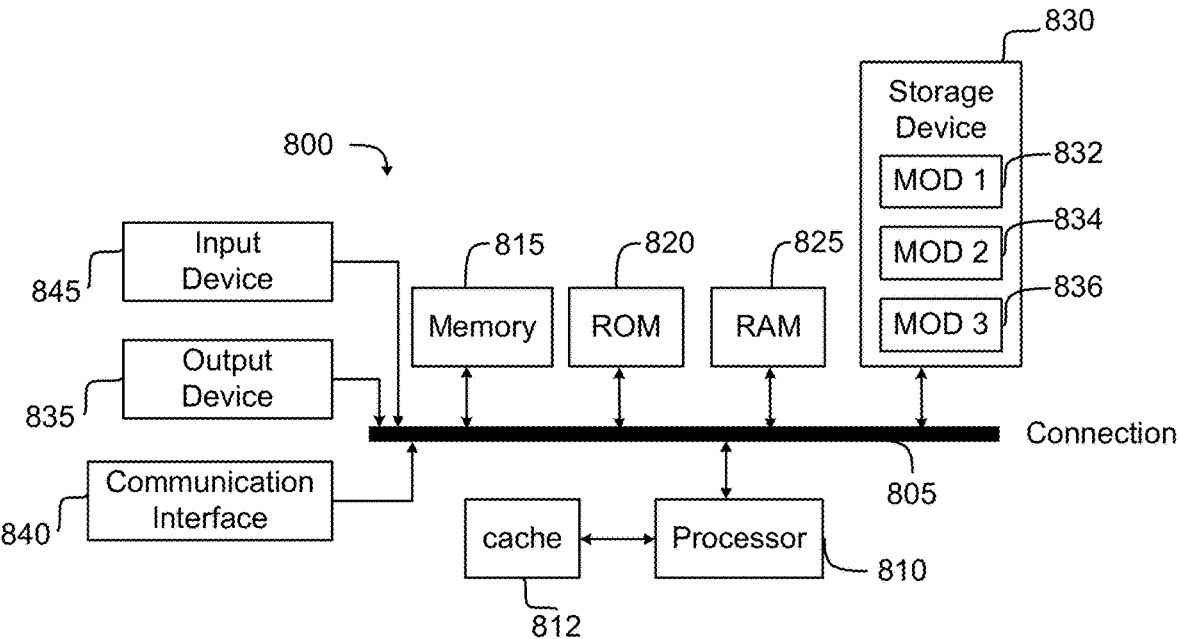
FIG. 8 is a block diagram illustrating an example of a computing system architecture, in accordance with some examples.

FIG. 8 illustrates an architecture of a computing system 800 wherein the components of the system 800 are in electrical communication with each other using a connection 805, such as a bus. Exemplary system 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Devices implementing methods or processes according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

What is claimed is:

1. A method for generating media content by a computing device associated with a media content provider, the method comprising:

obtaining media content captured by a media capture device located at a site of an event;

detecting a first biometric trigger based on first biometric data of a first user of a first user device associated with the event;

detecting a second biometric trigger based on second biometric data of a second user of a second user device associated with the event;

determining a portion of the obtained media content corresponding to the first biometric trigger and the second biometric trigger; and generating, based on the first biometric trigger and the second biometric trigger, a media segment including the portion of the obtained media content.

2. The method of claim 1, wherein the media capture device includes the first user device.

3. The method of claim 1, wherein the media capture device is separate from the first user device.

4. The method of claim 1, wherein the first user device associated with the event is located at the site of the event.

5. The method of claim 1, wherein the first user device associated with the event is located remotely from the site of the event.

6. The method of claim 1, wherein the first biometric data is obtained from at least one biometric sensor of a wearable device of the first user.

7. The method of claim 6, wherein the wearable device is a watch or a fitness tracker device.

8. The method of claim 1, wherein the first biometric data comprises at least one of a heart rate of the first user, a pulse of the first user, a temperature of the first user, or a breath rate of the first user.

9. The method of claim 1, wherein detecting the first biometric trigger based on the first biometric data comprises:

obtaining primary biometric data of the first user at a first time;

obtaining secondary biometric data of the first user at a second time;

detecting a change in the secondary biometric data as compared to the primary biometric data;

determining that the detected change corresponds to a biometric pattern; and detecting the first biometric trigger based on the detected change corresponding to the biometric pattern.

10. The method of claim 1, wherein generating the media segment includes capturing the media segment based on the first biometric trigger, the second biometric trigger, and a media segment duration.

11. The method of claim 2, further comprising:

generating the media segment based on the first biometric trigger, the second biometric trigger, and at least one other trigger.

12. The method of claim 1, further comprising:

generating a collection of media segments including the media segment at least one other media segment.

13. A computing device associated with a media content provider, the computing device comprising:

one or more memories; and one or more processors coupled to the one or more memories and configured to:

obtain media content captured by a media capture device located at a site of an event;

detect a first biometric trigger based on first biometric data of a first user of a first user device associated with the event;

detect a second biometric trigger based on second biometric data of a second user of a second user device associated with the event;

determine a portion of the obtained media content corresponding to the first biometric trigger and the second biometric trigger; and generate, based on the first biometric trigger and the second biometric trigger, a media segment including the portion of the obtained media content.

14. The computing device of claim 13, wherein the media capture device includes the first user device.

15. The computing device of claim 13, wherein the media capture device is separate from the first user device.

16. The computing device of claim 13, wherein the first user device associated with the event is located at the site of the event.

17. The computing device of claim 13, wherein the first user device associated with the event is located remotely from the site of the event.

18. The computing device of claim 13, wherein the one or more processors are configured to obtain the first biometric data from at least one biometric sensor of a wearable device of the first user.

19. The computing device of claim 13, wherein the first biometric data comprises at least one of a heart rate of the first user, a pulse of the first user, a temperature of the first user, or a breath rate of the first user.

20. The computing device of claim 13, wherein, to detect the first biometric trigger based on the first biometric data, the one or more processors are configured to:

obtain primary biometric data of the first user at a first time;

obtain secondary biometric data of the first user at a second time;

detect a change in the secondary biometric data as compared to the primary biometric data;

determine that the detected change corresponds to a biometric pattern; and detect the first biometric trigger based on the detected change corresponding to the biometric pattern.

\* \* \* \* \*